US012567980B2

(12) United States Patent
Bhardwaj et al.

(10) Patent No.: US 12,567,980 B2
(45) Date of Patent: Mar. 3, 2026

(54) DELIVERING APPLICATIONS ON DEMAND BASED ON TRUST BETWEEN SYSTEMS

(71) Applicant: Omnissa, LLC, Mountain View, CA (US)

(72) Inventors: Tushar Bhardwaj, Bangalore (IN); Vimal Gupta, Bangalore (IN); Paul Andrew Green, London (GB); Rohit Pradeep Shetty, Bangalore (IN)

(73) Assignee: Omnissa, LLC, Mountain View, CA (US)

( * ) Notice: Subject to any disclaimer, the term of this patent is extended or adjusted under 35 U.S.C. 154(b) by 262 days.

(21) Appl. No.: 18/466,154

(22) Filed: Sep. 13, 2023

(65) Prior Publication Data

US 2025/0088371 A1     Mar. 13, 2025

(51) Int. Cl.
*H04L 9/32* (2006.01)
*H04L 67/141* (2022.01)

(52) U.S. Cl.
CPC .......... *H04L 9/3263* (2013.01); *H04L 9/3247* (2013.01); *H04L 67/141* (2013.01)

(58) Field of Classification Search
CPC .... H04L 9/3263; H04L 9/3247; H04L 67/141
See application file for complete search history.

(56) References Cited

U.S. PATENT DOCUMENTS

| | | | |
|---|---|---|---|
| 2020/0241894 A1* | 7/2020 | Li | G06F 9/45558 |
| 2021/0234919 A1* | 7/2021 | Paralikar | H04L 67/563 |
| 2023/0155984 A1* | 5/2023 | Adam | H04L 63/105 726/26 |

* cited by examiner

*Primary Examiner* — Clayton R Williams
(74) *Attorney, Agent, or Firm* — Kim & Stewart LLP

(57) ABSTRACT

A computerized method of delivering applications includes transmitting, by a connection server, a registration request to an application manager server, the registration request including administration credentials for the application manager server and a public certificate of the connection server, the administration credentials causing the application manager server to trust the connection server regarding application requests; receiving, by the connection server, a user application launch request from a user device, the user application launch request identifying an application; generating a proxy application launch request for the received user application launch request, the proxy application launch request identifying the application and including a signed message created with a private key associated with the public certificate; and transmitting the proxy application launch request for delivery to the application manager server, causing the application manager server to make the application available to the user device after authenticating the signed message.

20 Claims, 18 Drawing Sheets

200

200

440

322

Add Entitlements

Add new users and groups who can use the selected pool(s)

Add    Remove

| Name | Domain | Email |
|------|--------|-------|

No records available

Rows per page    20 ⌄    0 row(s)

Cancel    Ok

200

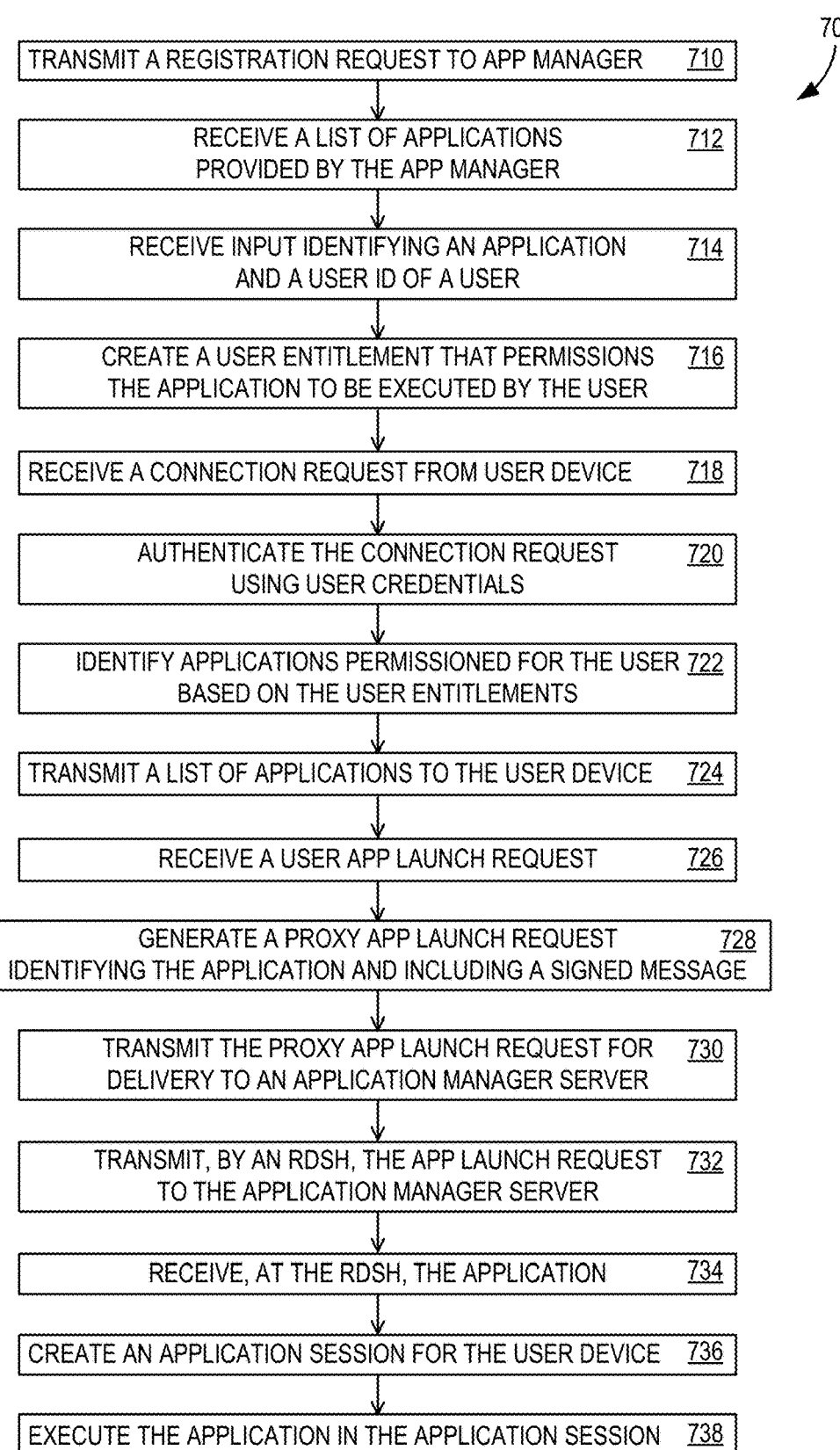

700

| TRANSMIT A REGISTRATION REQUEST TO APP MANAGER | 710 |

| RECEIVE A LIST OF APPLICATIONS PROVIDED BY THE APP MANAGER | 712 |

| RECEIVE INPUT IDENTIFYING AN APPLICATION AND A USER ID OF A USER | 714 |

| CREATE A USER ENTITLEMENT THAT PERMISSIONS THE APPLICATION TO BE EXECUTED BY THE USER | 716 |

| RECEIVE A CONNECTION REQUEST FROM USER DEVICE | 718 |

| AUTHENTICATE THE CONNECTION REQUEST USING USER CREDENTIALS | 720 |

| IDENTIFY APPLICATIONS PERMISSIONED FOR THE USER BASED ON THE USER ENTITLEMENTS | 722 |

| TRANSMIT A LIST OF APPLICATIONS TO THE USER DEVICE | 724 |

| RECEIVE A USER APP LAUNCH REQUEST | 726 |

| GENERATE A PROXY APP LAUNCH REQUEST IDENTIFYING THE APPLICATION AND INCLUDING A SIGNED MESSAGE | 728 |

| TRANSMIT THE PROXY APP LAUNCH REQUEST FOR DELIVERY TO AN APPLICATION MANAGER SERVER | 730 |

| TRANSMIT, BY AN RDSH, THE APP LAUNCH REQUEST TO THE APPLICATION MANAGER SERVER | 732 |

| RECEIVE, AT THE RDSH, THE APPLICATION | 734 |

| CREATE AN APPLICATION SESSION FOR THE USER DEVICE | 736 |

| EXECUTE THE APPLICATION IN THE APPLICATION SESSION | 738 |

RECEIVE A REGISTRATION REQUEST FROM SERVER DEVICE  810

SUCCESSFULLY AUTHENTICATE ADMIN CREDENTIALS  812
FROM THE REGISTRATION REQUEST

TRANSMIT APPLICATION LIST TO SERVER DEVICE     814

RECEIVE AN APP LAUNCH REQUEST     816
FOR A FIRST APPLICATION

SUCCESSFULLY AUTHENTICATE THE APP LAUNCH REQUEST  818

TRANSMIT THE FIRST APPLICATION FOR EXECUTION     820

Figure 9:
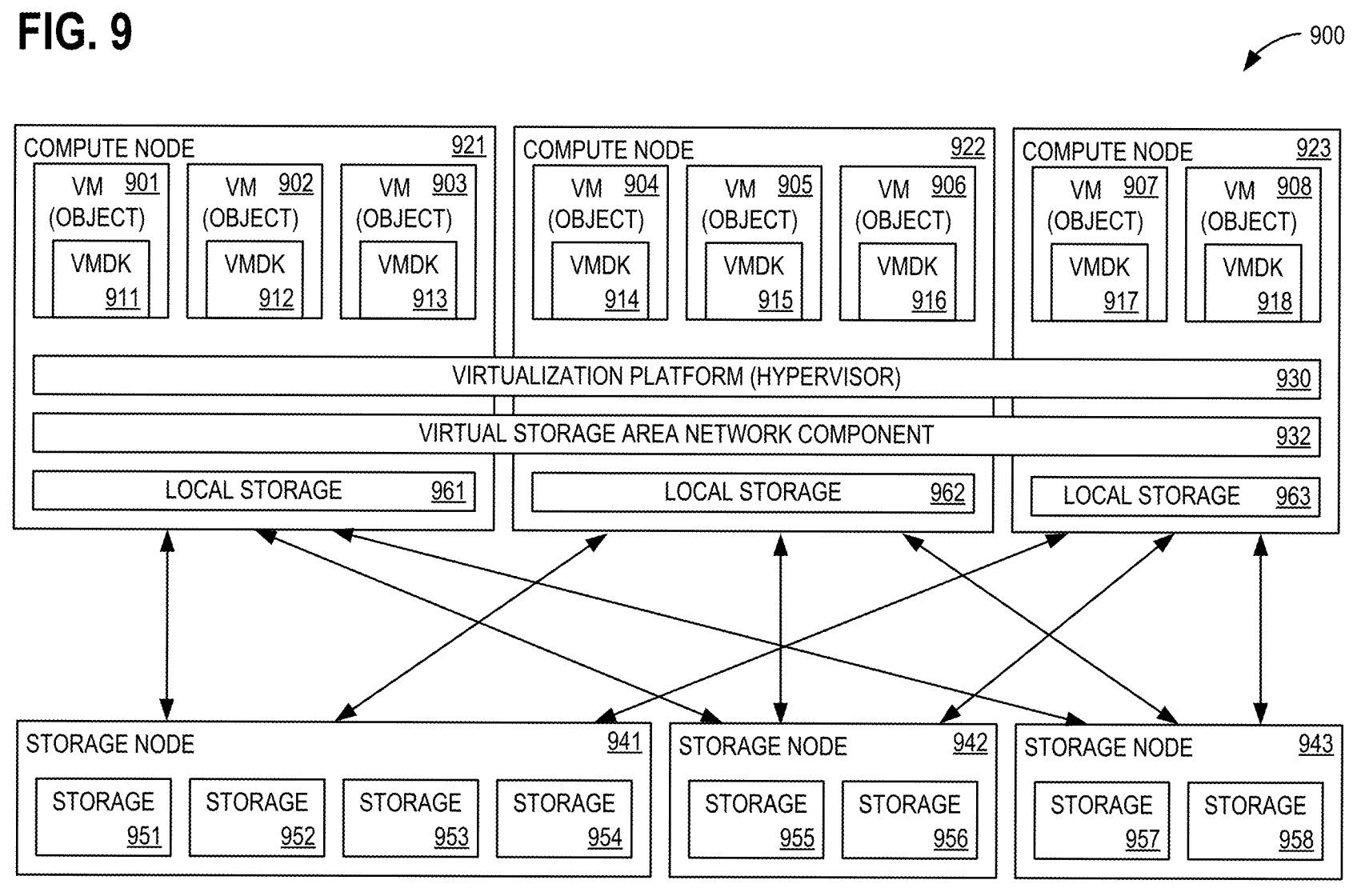

COMPUTE NODE 921

VM 901 (OBJECT) — VMDK 911
VM 902 (OBJECT) — VMDK 912
VM 903 (OBJECT) — VMDK 913

COMPUTE NODE 922

VM 904 (OBJECT) — VMDK 914
VM 905 (OBJECT) — VMDK 915
VM 906 (OBJECT) — VMDK 916

COMPUTE NODE 923

VM 907 (OBJECT) — VMDK 917
VM 908 (OBJECT) — VMDK 918

VIRTUALIZATION PLATFORM (HYPERVISOR) 930

VIRTUAL STORAGE AREA NETWORK COMPONENT 932

LOCAL STORAGE 961

LOCAL STORAGE 962

LOCAL STORAGE 963

STORAGE NODE 941

STORAGE 951
STORAGE 952
STORAGE 953
STORAGE 954

STORAGE NODE 942

STORAGE 955
STORAGE 956

STORAGE NODE 943

STORAGE 957
STORAGE 958

FIG. 10

DELIVERING APPLICATIONS ON DEMAND BASED ON TRUST BETWEEN SYSTEMS

BACKGROUND

A software entitlement system is a type of digital rights management (DRM) system for controlling access to resources. Software entitlement systems may employ encryption, licensing, and access control mechanisms to enforce content protection, and may involve a combination of software, hardware, and network components to ensure that content remains secure throughout its lifecycle. The features of these systems include, for example, authentication and authorization services, such as verifying the identity and rights of users before granting access to protected content. Another feature is encryption, which scrambles the protected content, making it unreadable without the appropriate decryption keys. There are also licensing and permissions associated with digital content to limit access to particular users or devices, such as the number of devices allowed, time-limited access, or the ability to make copies. Another feature is to implement access control to restrict how the digital content is used, such as limiting the number of concurrent users, imposing geographical restrictions, or enforcing restrictions on copying, printing, or sharing. Watermarking is another feature, which embeds unique identifiers into the content to track unauthorized copies and identify the source of leaks or piracy.

Some virtualization environments provide a virtual desktop infrastructure (VDI) and/or remote desktop session host (RDSH) servers that allows users to remotely access a virtual desktop. In such cases, a user typically executes a client application from their personal computing device to communicate with a connection server. The connection server authenticates the user and coordinates establishing application sessions or windows sessions between the client application and the VDI, the RDSH, or the like. The user can then execute applications through this application session.

In some instances, access to applications provided within the virtualization environment may be controlled and managed by the connection server. In such architectures, the connection server manages user entitlements for the applications (e.g., identifying which application(s) a particular user is entitled to execute). However, if the virtualization environment also supports application access through other means, such as an on-demand application platform, then user entitlement data may be duplicated in multiple systems, leading to technical challenges and inefficiencies.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In some examples, a method manages user entitlements for applications and delivers applications in a virtualized environment. Solutions include: transmitting, by a connection server, a registration request to an application manager server, the registration request including administration credentials for the application manager server and a public certificate of the connection server, the administration credentials causing the application manager server to trust the connection server regarding application requests; receiving, by the connection server, a user application launch request from a user device, the user application launch request identifying a first application provided by the application manager server; generating, by the connection server, a proxy application launch request for the received user application launch request, the proxy application launch request identifying the first application and including a signed message created with a private key associated with the public certificate; and transmitting the proxy application launch request for delivery to the application manager server, causing the application manager server to make the first application available to the user device after authenticating the signed message.

BRIEF DESCRIPTION OF THE DRAWINGS

The present description will be better understood from the following detailed description read in the light of the accompanying drawings, wherein:

FIG. 7 illustrates a flowchart of exemplary operations associated with performing user entitlements for applications in an example architecture, such as the architecture of FIG. 1;

FIG. 9 illustrates an example virtualization architecture that may be used as a computing platform; and FIG. 10 illustrates a block diagram of an example computing apparatus that may be used as a component of an example architecture, such as the architectures of FIG. 1 and FIG. 6.

Figure 1:
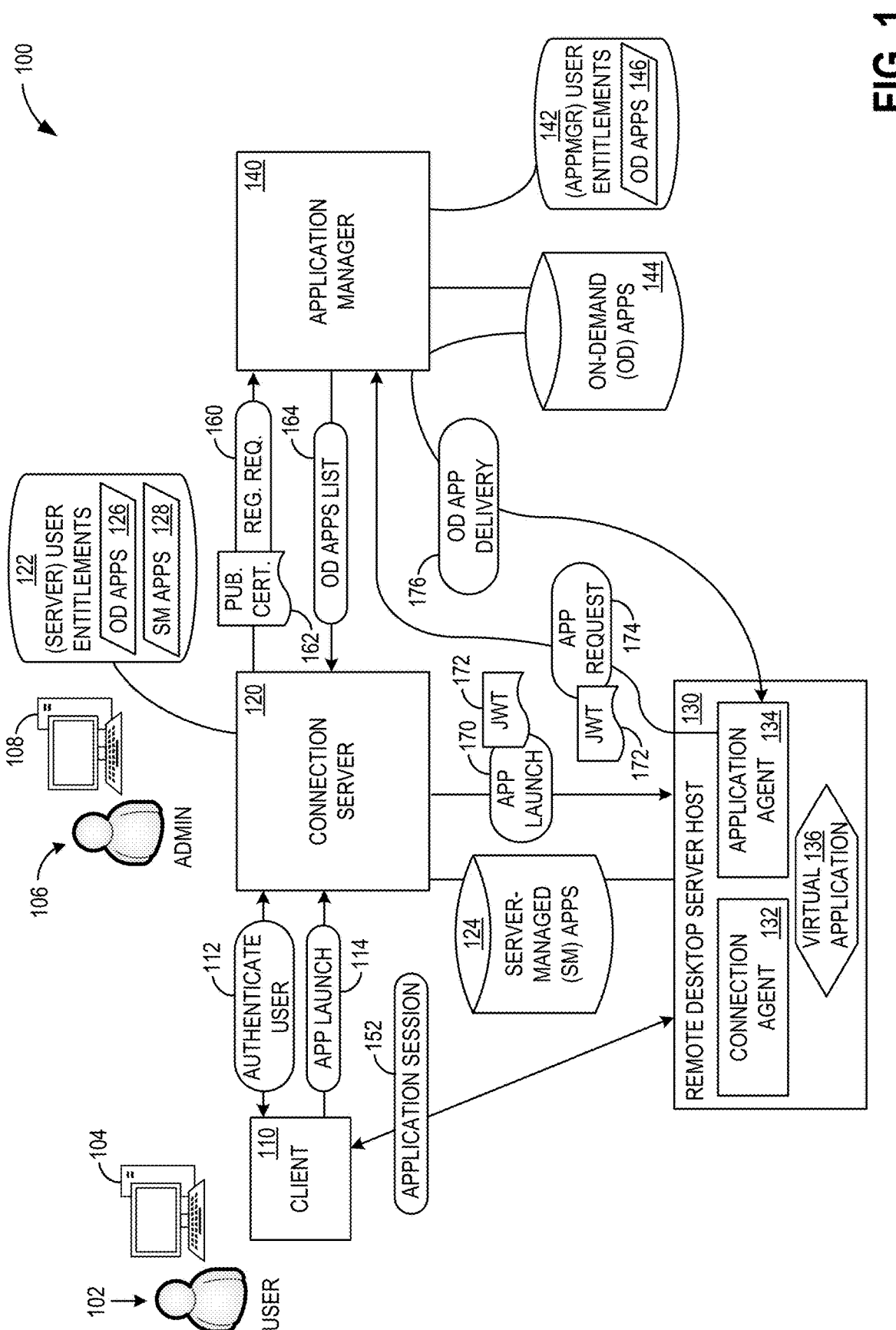
FIG. 1 illustrates an example architecture that advantageously delivers applications ("apps") based on trust between two systems.

Any of the figures may be combined into a single example or embodiment.

DETAILED DESCRIPTION

In some scenarios, applications are made available to users through two distinct application sources: a connection server and an application manager. The connection server brokers and manages client connection requests to the virtualization environment, while managing and providing access to server-managed (SM) applications for application sessions. The application manager manages and provides access to on-demand (OD) applications, which are separately hosted by the application manager. Each of these two application sources maintains a separate user entitlement database that defines which users are entitled (e.g., licensed or otherwise have access) to execute which applications. This dual user entitlement architecture presents several technical problems, including having to maintain and man- age multiple user entitlement databases, much of which may be duplicative. That is, entitlement of a particular user to a particular application may be duplicated in multiple data- bases to ensure that user can get access to the application through either source.

In some examples, a system and method allow multiple application sources and their respective user entitlement systems to work together to provide user access to applica- tions while maintaining distinct user entitlement data, thus overcoming the technical problems of having to maintain and manage multiple user entitlement databases. The con- nection server is configured to establish trust, regarding entitlements, with the application manager. During configu- ration, a registration request is sent from the connection server to the application manager along with a public certificate of the connection server. This registration request includes authentication credentials of the application man- ager to establish privilege to establish this trust. This trust causes the application manager to forego any user entitle- ment checking through its own local entitlements database when later receiving an application request from this par- ticular connection server. The successful registration process causes the application manager to trust the connection server to manage and confirm user entitlements, and the application manager will thereafter provide applications requested from that connection server without any additional user entitle- ment checking.

Once trust is established, the application manager pro- vides the connection server with a list of applications offered by the application manager, thus establishing visibility to the particular applications provided by the application manager. In some examples, an administrator then defines user entitle- ments of particular users for particular applications provided by the application manager, but within the user entitlements database of the connection server rather than within the application manager. At this stage, the connection server is now configured to perform user entitlement for both the SM applications and for the OD applications.

During operation, when a user initiates execution of a particular application, the connection server performs user entitlement confirmation for that user and that application. When the entitlement is confirmed, the connection server generates and transmits an application request to the appli- cation manager for the particular application. This applica- tion request includes a server identifier (ID) for the connec- tion server as well as a signed token generated by the connection server using its own private key. The server ID is used by the application manager to identify the particular connection server, and more particularly to identify the public certificate for that connection server. That public certificate contains the public key that is used by the application manager to verify the signed token, thus verify- ing the identity of the connection server and confirming the trust for this application request. Upon confirming that the application request originated from a trusted source (e.g., the connection server), the application manager provides access to the requested application for the user.

Aspects of the disclosure improve the operations of the computer by establishing a level of user entitlement trust between a first application system (e.g., the connection server) and a second application system (e.g., the application manager). This trust effectively consolidates user entitlement into a single database, allowing the first application system to manage user entitlements to both its own set of applications (e.g., the SM applications) as well as to appli- cations offered by the second application system (e.g., the OD applications) without having to duplicate user entitle- ment data across multiple databases. This trust between the systems helps reduce storage space used by the application systems as well as reducing the computational complexity of the application systems by eliminating a second, duplicative user entitlement determination.

While described with reference to VMs in various examples, the disclosure is operable with any form of virtual computing instance (VCI) including, but not limited to, VMs, containers, or other types of isolated software entities that can run on a computer system. Alternatively, or addi- tionally, the architecture is generally operable in non-virtu- alized implementations and/or environments without depart- ing from the description herein.

FIG. 1 illustrates an example architecture 100 that advan- tageously delivers applications (apps) based on trust between two systems. Architecture 100 uses a computing platform which may be implemented on one or more com- puting apparatus 1018 of FIG. 10, and/or using a virtual- ization architecture 900 as is illustrated in FIG. 9. In this example, a user 102 uses a user device 104 to execute applications provided by the architecture 100. The architec- ture 100 includes two systems that provide applications to users 102, namely a connection server 120 and an applica- tion manager 140. More specifically, the connection server 120 manages a group of applications referred to herein as server-managed (SM) applications 124, and the application manager 140 manages a group of applications referred to herein as on-demand (OD) applications 144. Each of these application sources includes their own separate database of user entitlements that are used to control access and per- missions to these applications 124, 144. The connection server 120 maintains a server user entitlements database 122 and the application manager 140 maintains an application manager (appmgr) user entitlements database 142. The example architecture 100 of FIG. 1 is configured to establish a trust between the connection server 120 and the applica- tion manager 140 such as to allow the connection server 120 to control entitlement to the OD applications 144 of the application manager 140 (e.g., without the application man- ager 140 performing user-level entitlement checking).

Figure 2A:
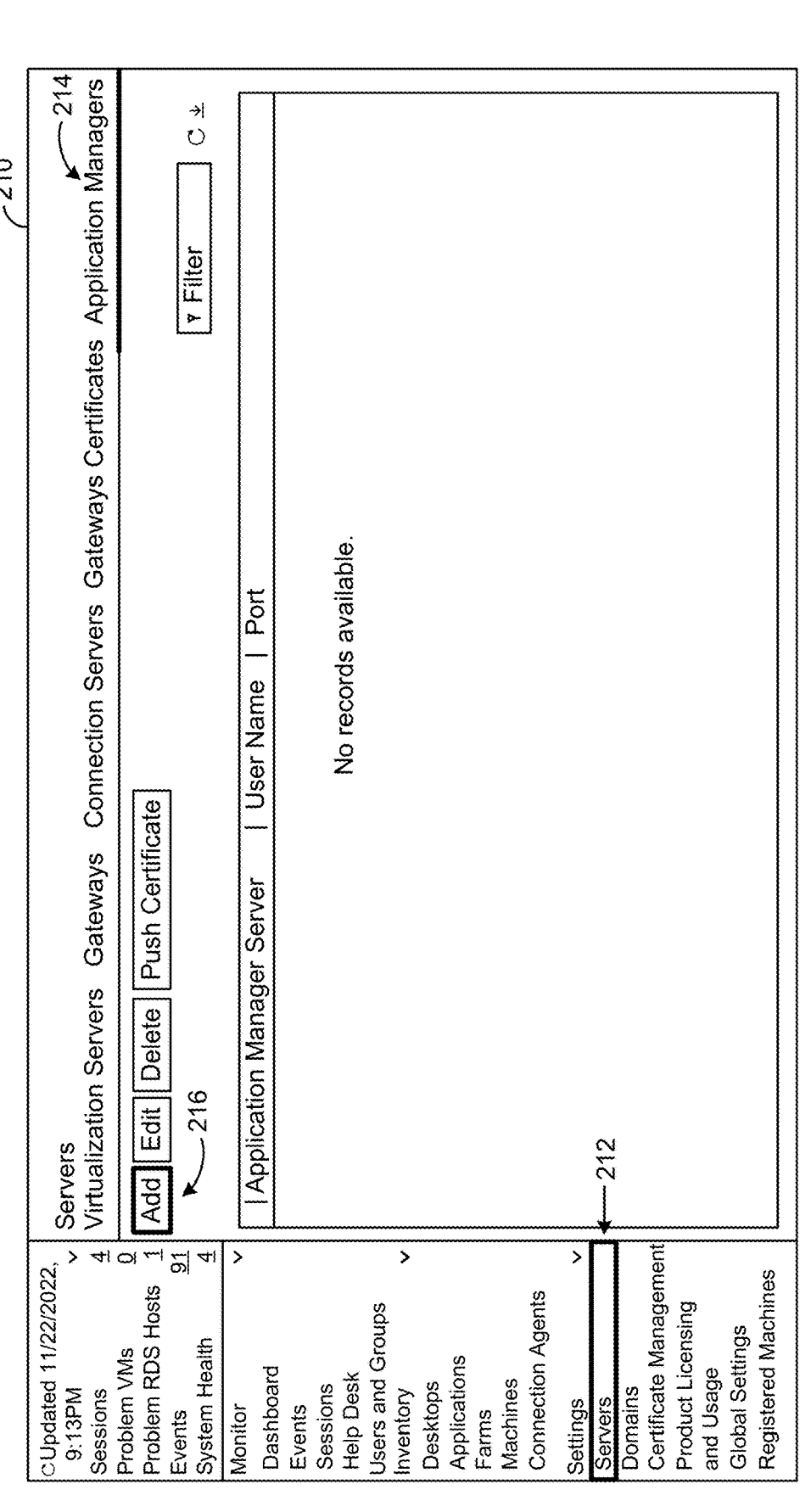
FIG. 2A to FIG. 2C illustrate example user interfaces including associated screens for registering the connection server with the application manager.
Figure 2B:
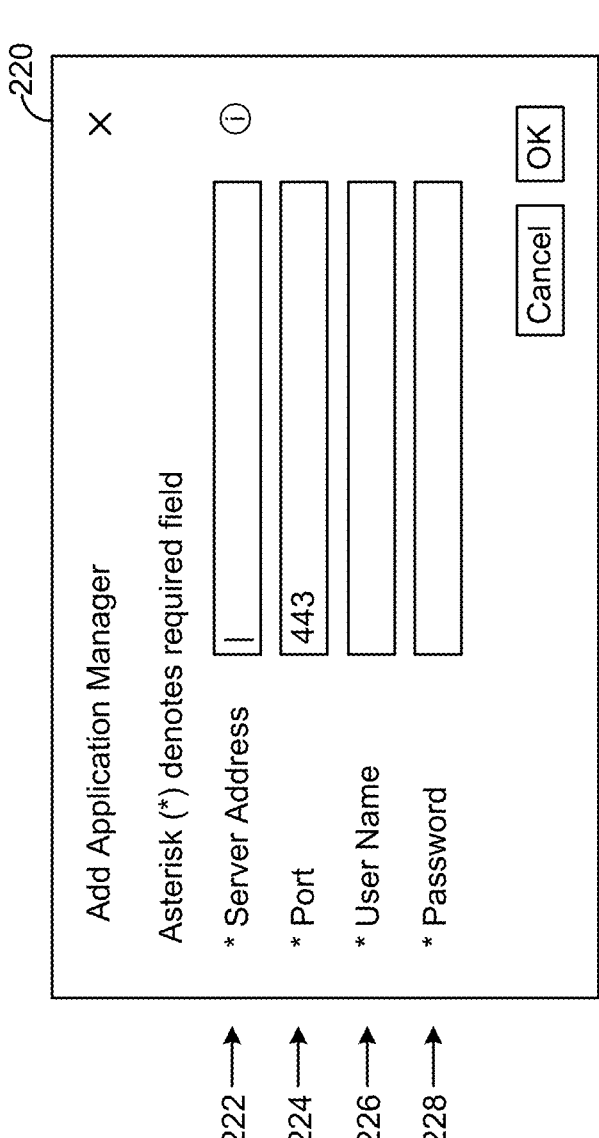
Figure 2C:
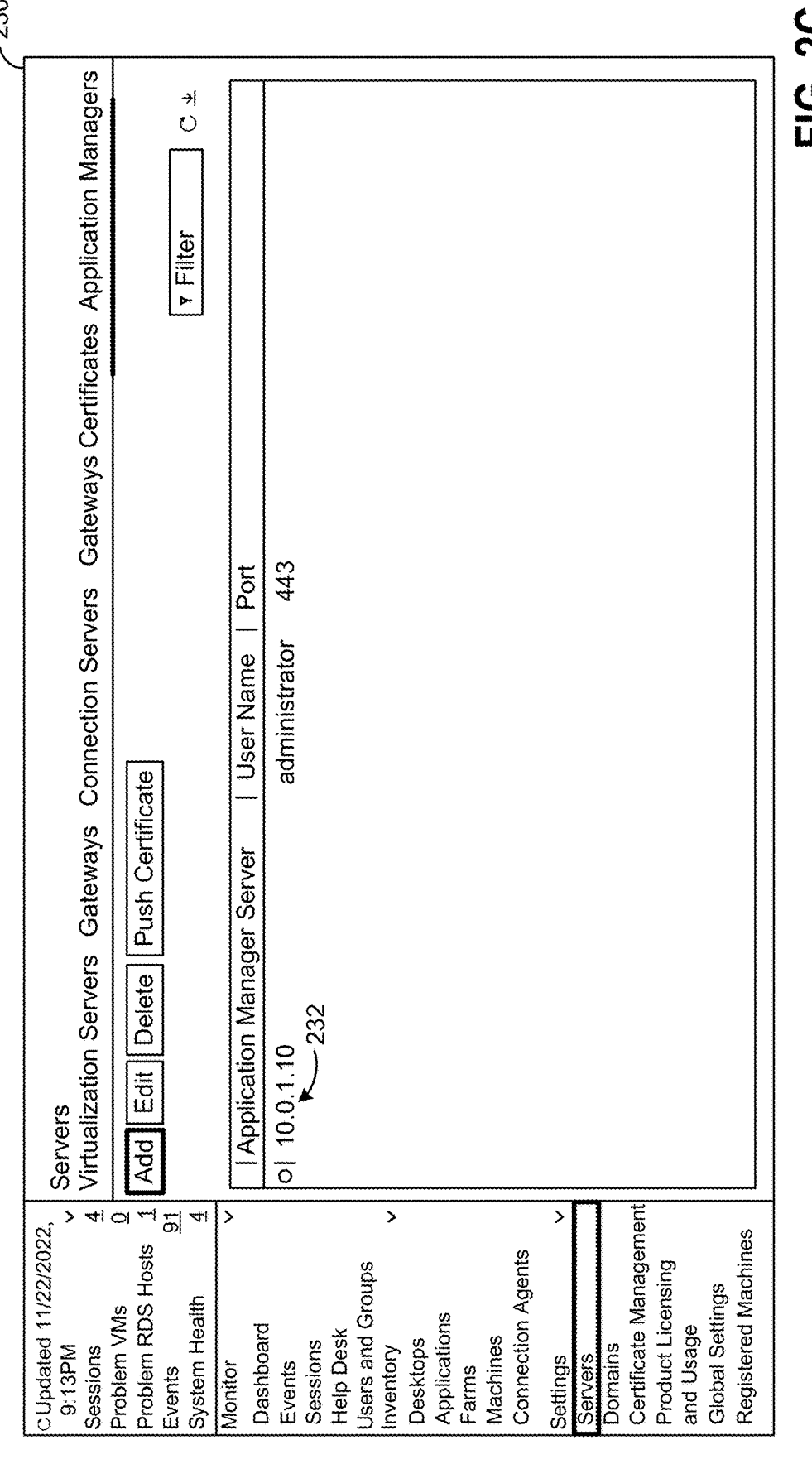

During a configuration process, the connection server 120 establishes trust with the application manager 140. The connection server 120 creates and transmits a registration request 160 to the application manager 140 (e.g., via a web URL of the application manager 140). The application manager 140 may, for example, expose an endpoint for receipt of registration requests 160. The registration request 160 provides a unique identifier of the connection server 120 (e.g., a trusted server ID) and also includes administrative account credentials for the application manager 140. The connection server 120 also transfers a public key of the connection server 120 to the application manager 140 (e.g., as a public certificate 162 or other secure key exchange protocol, via an endpoint exposed by the application man- ager 140, or the like) that will be used by the application manager 140 to confirm and authenticate subsequent corre- spondence with the connection server 120. Further, the connection server 120 also stores the record of the endpoint of the application manager 140, as well as administrative credentials. After authenticating the administrative account credentials, the application manager 140 stores the identity of the now-trusted connection server 120, as well as the associated public key. FIG. 2A to FIG. 2C, below, illustrate an example user interface (UI) and associated screens for registering the connection server 120 with the application manager 140.

Figure 3A:
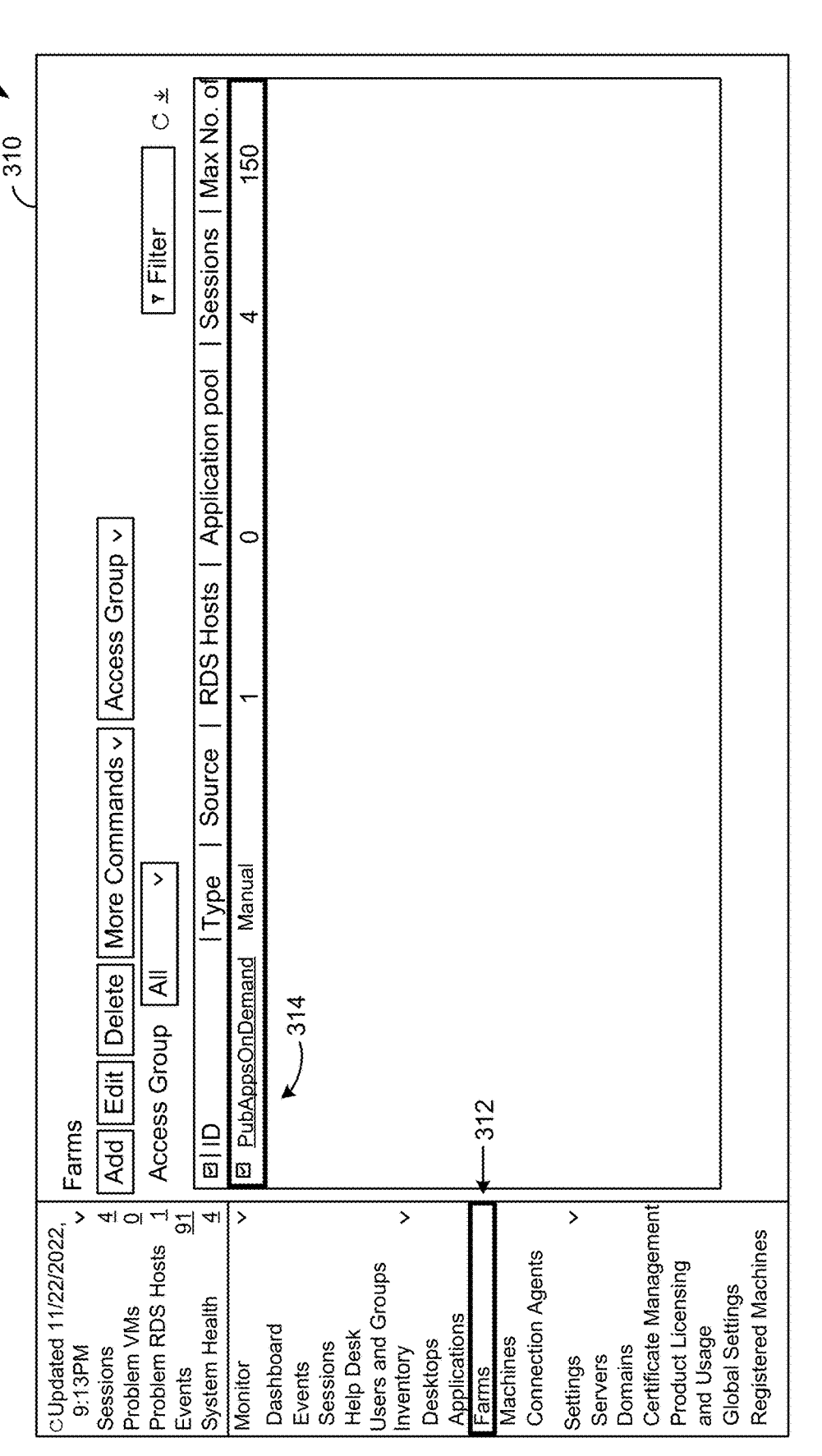
FIG. 3A and FIG. 3B illustrate example user interfaces including associated screens that allow the admin to configure a particular farm managed by the connection server with the application manager.
Figure 3B:
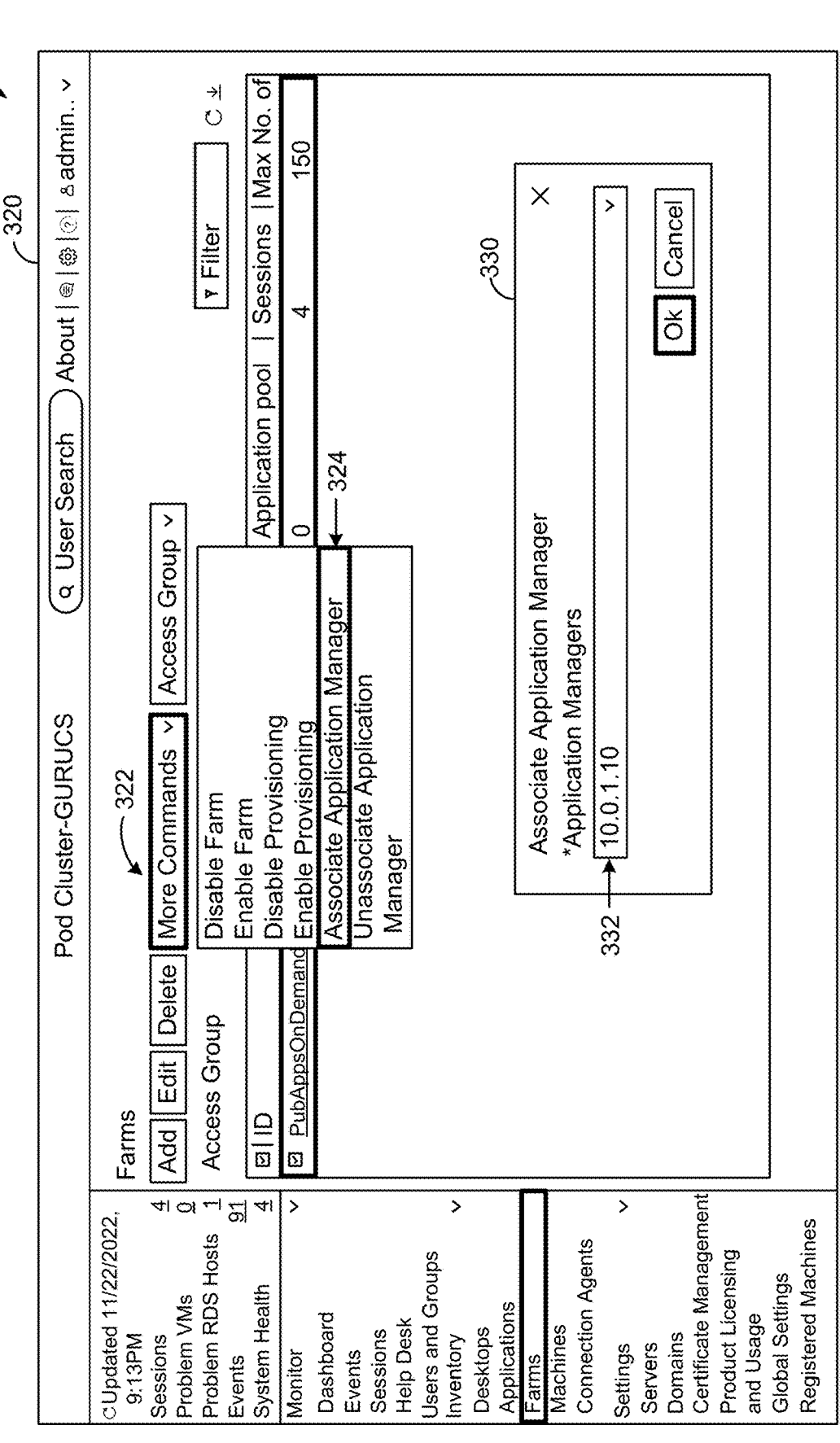

In some examples, the architecture 100 allows the connection server 120 to perform associations between farms and already-registered application managers 140. Each mapping between a particular farm (e.g., a particular set of VMs, virtual application 136, RDSHs 130, or the like) and the application manager 140 allows the application manager 140 to deliver OD apps 144 to that farm. Using these mappings, the connection server 120 can establish that the RDSH 130 in the farm has a communication channel with the application manager 140. FIG. 3A and FIG. 3B, below, illustrate an example UI and associated screens for configuring a particular farm managed by the connection server 120 with the application manager 140.

After the application manager 140 confirms and configures the registration of the connection server 120, the application manager 140 transmits an applications list message 164 to the connection server 120. The applications list message 164 includes a list of OD applications 144 that the application manager 140 makes available to the connection server 120. The list of applications may include all OD applications 144 provided by the application manager 140, or may include a limited list of OD applications 144 made available to this particular connection server 120 or particular registration. For example, the list of applications may include unique application IDs or application group IDs for particular applications, application data such as version, supported OS type and version, prerequisite applications data, or the like. The data from this applications list message 164 represents the list of OD applications 144 for which the administrator 106 may assign entitlements to particular users 102 or user groups (e.g., during configuration of OD applications entitlements 126).

After registration and receipt of the applications list message 164 from the application manager 140, the administrator 106 configures user entitlements 122 for the OD applications 144 (e.g., via an admin device 108). The connection server 120 controls user entitlements 122 for SM apps 124 (e.g., SM application entitlements 128). These server-side user entitlements 122 include SM applications entitlements 128 and OD applications entitlements 126, where SM applications entitlements 128 control access to the group of SM applications provided and managed directly by the connection server 120, and where OD applications entitlements 126 control access to the group of OD applications 144 provided and managed by the application manager 140. Each of the user entitlements 126, 128 identifies which particular users 102 can access (e.g., request, retrieve, mount, execute) which of the SM applications 124 or OD applications 144, respectively, within the architecture 100. Each user entitlement 126, 128 may include for example, user IDs, user group IDs, or other user data (e.g., user names, departments, roles, device information such as OS type, domain data, or the like), application IDs, application group IDs, volume IDs, or other application data (e.g., application version data, supported OS type and version, path data, application manager data, or the like). FIG. 4A to FIG. 4F, below, illustrate an example UI and associated screens for configuring OD user entitlements 126 for OD applications 144.

In some examples, the user entitlements 126, 128 include application entitlements, desktop entitlements, group entitlements, role-based access control (RBAC), and/or time-based entitlements. With application entitlements, specific applications are assigned to users. With desktop entitlements, users who are entitled to a desktop will have access to that particular desktop configuration when they log in. Group entitlements allow entitlements to be defined for groups of users, rather than individual users. Users belonging to a particular group inherit the application or desktop entitlements assigned to that group. RBAC allows roles to be assigned to users. Each role has a specific set of permissions and access rights. Time-based entitlements define specific timeframes during which users have access to applications or desktops.

During operation, the client 110 initiates a connection with the connection server 120, and the connection server 120 authenticates the user 102 at 150. Upon successful authentication, in some examples, an HTTP session is created between the client 110 and the connection sever 120. In this example, the connection server 120 uses the identity of the user and the user entitlements 122 (e.g., the OD applications entitlements 126) to identify a list of OD applications 144 for which this particular user 102 is permissioned. This list of entitled applications is transmitted back to the client 110 for display to the user 102 (e.g., as a set of clickable icons in a UI, or the like). The list of entitled applications includes application metadata, such as application ID, application group ID, or volume ID (e.g., identifying which application to execute), a display name and icon for the application, or other related metadata associated with each application.

The user 102 selects a particular OD application 144 from the list of permissioned OD applications 144 from within a UI provided by the client 110 (e.g., by clicking on an associated icon). In response, the client 110 initiates application launch by transmitting an application launch 114 message for a particular OD application 144 to the connection server 120. This application launch 114 message includes identifying information for the particular OD application 144 (e.g., the application ID) to be executed, and may include other information such as a user ID of the requesting user 102 or client 110. Upon receipt, the connection server 120 verifies that the requesting user 102 has permission to execute the requested OD application 144 (e.g., by comparing the user ID and requested application ID to the OD applications 126 entitlements).

Upon successful verification of entitlement at the connection server 120, the connection server 120 generates an application launch 170 message. This application launch 170 message identifies the requested OD application 144 (e.g., by application ID), as well as identity information for the connection server 120 (e.g., for registration confirmation by the application manager 140). More specifically, in examples, the application launch 170 message includes a JavaScript Object Notation (JSON) Web Token ("JWT") 172. JWT is a compact, URL-safe means of representing claims between two parties. It is a self-contained token that can securely transmit information between parties (e.g., connection server 120 and application manager 140) as a JSON object. The structure of the JWT 172 includes three parts, a header, a payload, and a signature. In these examples, the header of the JWT 172 contains metadata about the type of token and the algorithm used for signing the token. For example, the token is encoded in a Base64url string and includes information such as a token type and a signing algorithm, such as HMAC SHA256, RSA, or the like. The header may include, for example, a serial number, a cluster GUID, and an algorithm identifier. The payload of the JWT 172 contains data about this application launch 170, such as application data for the application being requested for delivery and launch (e.g., application ID, application group ID, volume ID, or the like), and client data (e.g., user identity information for the requesting user 102, client identity information for the requesting client 110, and the like). The signature of the JWT 172 is used to verify the integrity of the JWT 172 and ensure that it has not been tampered with. The signature is created by taking the encoded header and encoded payload and applying a specific signing algorithm using a secret key. For example, the secret key is the private key of the connection server 120 that was used during the registration request 160 and for the public certificate 162, and for which the application manager 140 has the associated public key. In other examples, other encrypted communications methods may be used, including symmetric or asymmetric encryption algorithms, such as Advanced Encryption Standard (AES), Data Encryption Standard (DES), Triple DES (3DES), Blowfish, Twofish, or the like.

Traditionally, JWT keys are exposed on a standard web URL by a server and all the clients retrieve them from a URL. Since the connection server 120 may be deployed inside a private network and the client 110 may be deployed in a public network, the traditional approach of exposing endpoints to retrieve JWT keys may cause issues. As such, the present architecture 100 pushes the public keys to the application manager 140 to automatically manage key distribution and rotation.

The JWT 172 is sent along with the application launch 170 to the application agent 134 on a remote desktop server host (RDSH) 130 (e.g., via the connection agent 132). The application agent 134 generates an application request 174 and transmits the application request 174 to the application manager 140 along with the JWT 172. In examples, when the application agent 134 is installed, the application agent 134 is paired with the application manager 140 by providing address and credentials of the application manager 140. As such, the application agent 134 has established a trusted communication channel with the application manager 140 that is used with the app request 174 and JWT 172.

Upon receipt of the application request 174 from the application agent 134, the application manager 140 unpacks the JWT 172 and authenticates the application request 174. More specifically, the application manager 140 identifies the identity of the connection server 120 (e.g., based on the trusted server ID provided in the JWT 172) and locates the public certificate 162 associated with the connection server 120 (e.g., as established during the registration request 160 process). If no valid registration is found, the application manager 140 denies the application request 174. If a valid registration is found, the application manager 140 verifies both the contents of the JWT and the digital signature of the JWT using the public key of the connection server 120. If the JWT is not properly authenticated, the application manager 140 denies the application request 174. If the JWT is authentic, the application manager 140 identifies the requested OD application 144 (e.g., by application ID) and transmits the OD application as OD application delivery 176 (e.g., transmitting the requested OD application 144 back to the application agent 134 on the RDSH 130.

The application agent 134 receives the requested OD application 144 from the application manager 140 and prepares the OD application 144 for execution (e.g., attaching a virtual disk associated with the OD app 144 to the RDSH 130, installing the OD application 144 on the RDSH 130, or the like). The application agent 134 confirms with the connection agent 132 when the OD application 144 is ready for execution, and the connection agent 132 shares the connection details to the connection server 120, which forwards this message to the client 110. The client 110 then connects with the RDSH 130 to connect to the OD application 144.

As such, the architecture 100 is able to establish a trusted relationship between the connection server 120 and the application manager 140 that allows user entitlement for applications 144 provided by the application manager 140 to be configured and verified by the connection server 120 (e.g., instead of being verified by the application manager 140). More specifically, while the application manager 140 may also maintain OD applications user entitlements 146 (e.g., for other application requests not coming from the connection server 120 or for registration requests 160 that are not registered and trusted between the connection server 120 and the application manager 140), it should be noted that these OD applications entitlements 146 are separate and distinct from the OD applications entitlements 126 established and maintained by the connection server 120. These OD applications entitlements 126 are not shared with the application manager 140 in these examples. As such, the application manager 140 does not perform user entitlement verification during an application request 164 from the connection server 120, and thus the OD applications entitlements 146 need not contain or be updated with the OD applications entitlements 126 configured on the connection server 120. Rather, in these examples, the connection server 120 performs user entitlement verification during an initial application launch 114 from the client 110, and the application manager 140 authenticates the trust in the connection server 120 during an application request 164 and does not perform user entitlement verification if the connection server 120 is trusted.

FIG. 2A to FIG. 2C illustrate an example UI and associated screens for registering the application manager 140 with the connection server 120. The UI may be displayed on the admin device 108 of FIG. 1. In the example, the admin 106 selects a "Servers" panel option 212 and further selects an "application volumes managers" menu option 214 to view the "Servers" screen 210 shown in FIG. 2A. No application volume manager servers (e.g., "application managers 140") are currently configured. The admin 106 selects an "Add" button 216 to add the application manager 140. In response, the UI displays an "add application volumes manager" screen 220 (e.g., as a pop-up overlay window) shown in FIG. 2B. This screen 220 includes a server address input field 222, a port input field 224, a user name input field 226, and a password input field 228. The admin 106 enters an IP address of the application manager 140 into the server address input field 222, a TCP port number of the application manager 140 into the port input field 224, and authentication credentials for the application manager 140 into the user name input field 226 and password input field 228 (e.g., an administrative user ID and associated password). Upon submission of this information, the connection server 120 transmits the registration request 160 to the application manager 140 (e.g., using the IP address and port) and authenticates with the application manager 140 using the authentication credentials entered here. The screen 230 of FIG. 2C shows an entry 232 for the application manager 140 after the registration process has been confirmed.

FIG. 3A and FIG. 3B illustrate screens for the UI that allow the admin 106 to configure a particular farm managed by the connection server 120 with the application manager 140. In the example, the admin 106 selects a "farms" panel option 312 to view a "Farms" screen 310 shown in FIG. 3A. One farm 314 named "PubAppsOnDemand" is currently configured, and this farm 314 has one RDS host configured. The admin 106 selects this farm 314 and selects a "More Commands" drop-down menu 322 as shown in FIG. 3B. This drop-down menu 322 includes an "Associate App Volumes Manager" option 324 that, when selected, causes an "Associate Application Volumes Manager" screen 330 to be displayed (e.g., as a pop-up overlay window). This screen 330 provides a drop-down menu 332 that includes a list of all application managers 140 with which this connection server 120 has already registered (e.g., such as the registration shown in FIG. 2C). Upon selection of this application manager 140 in this screen 330, this particular farm 314 (e.g., group of RDS hosts 130) becomes configured to use the application manager 140 for OD applications 144.

FIG. 4A to FIG. 4F illustrate screens for the UI that allow the admin 106 to configure user entitlements 122 for the OD applications 144. In the example, the admin 106 selects an "Applications" panel option 412 to view an "Application Pools" screen 410 shown in FIG. 4A. No application pools are currently configured. The admin 106 selects an "Add" drop-down menu 414 and selects an "Add from App Volumes Manager" option 416 from the menu 414 to begin user entitlement for OD applications 144 from the application manager 140. In response, the UI displays an "Add Application Pool" screen 420 shown in FIG. 4B. In a "Select Applications" step 422, the screen 420 displays an "RDS Farm" drop-down menu 424 from which the admin 106 selects a farm such as the farm 314 shown in FIG. 3A. This selection causes the screen 420 to display an IP address 426 of the associated farm 314. The screen 420 also includes an application selection list 428 titled "Select App Volumes Manager Applications." This application selection list 428 displays information for each OD application 144 presented to the connection server 120 from the application manager 140, with each row representing an OD application 144. Each OD application 144 in the list 428 shows a "Name" of the OD application 144, a "Version," and a "Path." In this example, the admin 106 selects a list entry 429 entitled "Google Chrome."

Figure 4A:
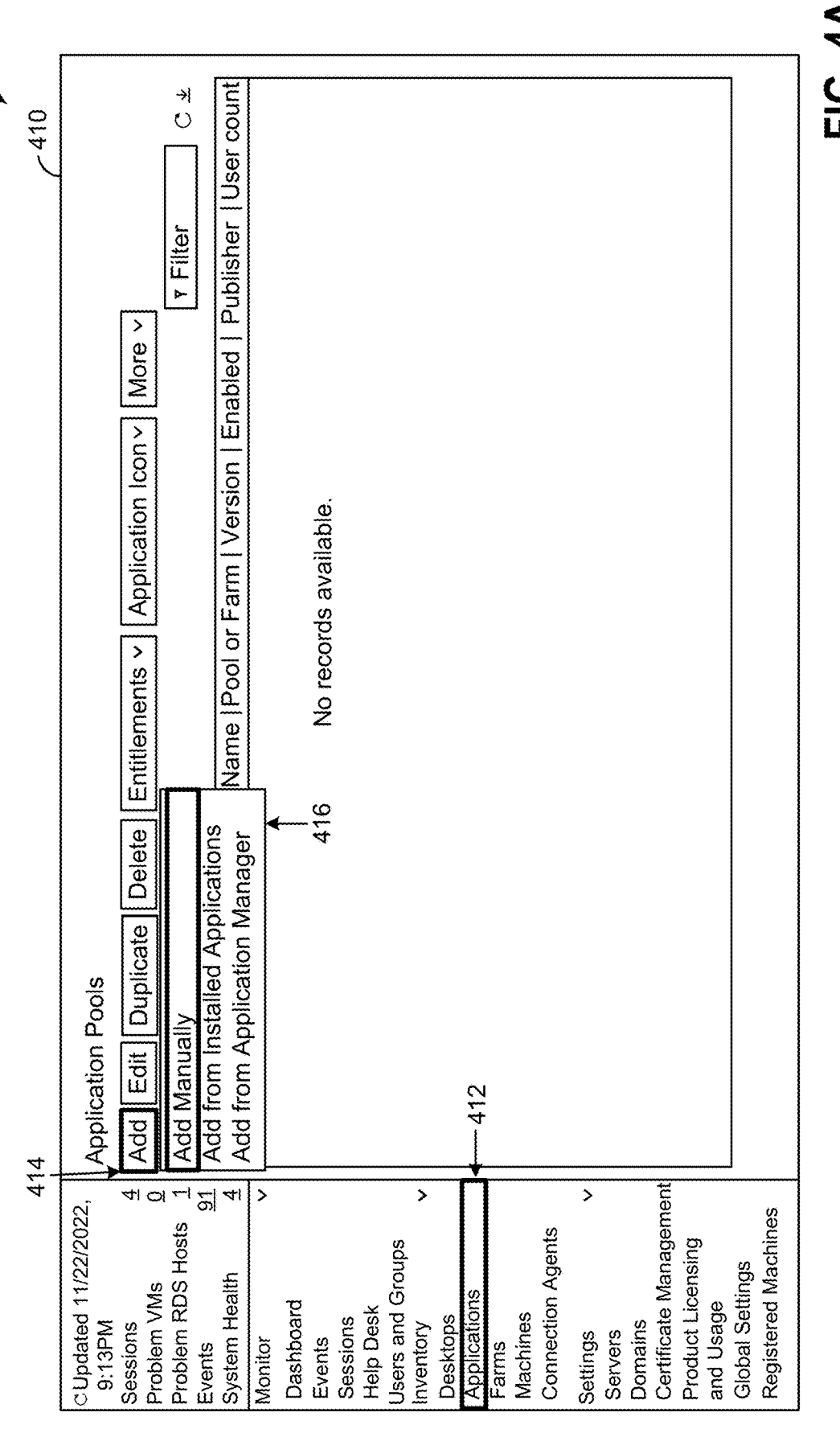
FIG. 4A to FIG. 4F illustrate example user interfaces including associated screens that allow the admin to configure user entitlements for on-demand (OD) applications.
Figure 4B:
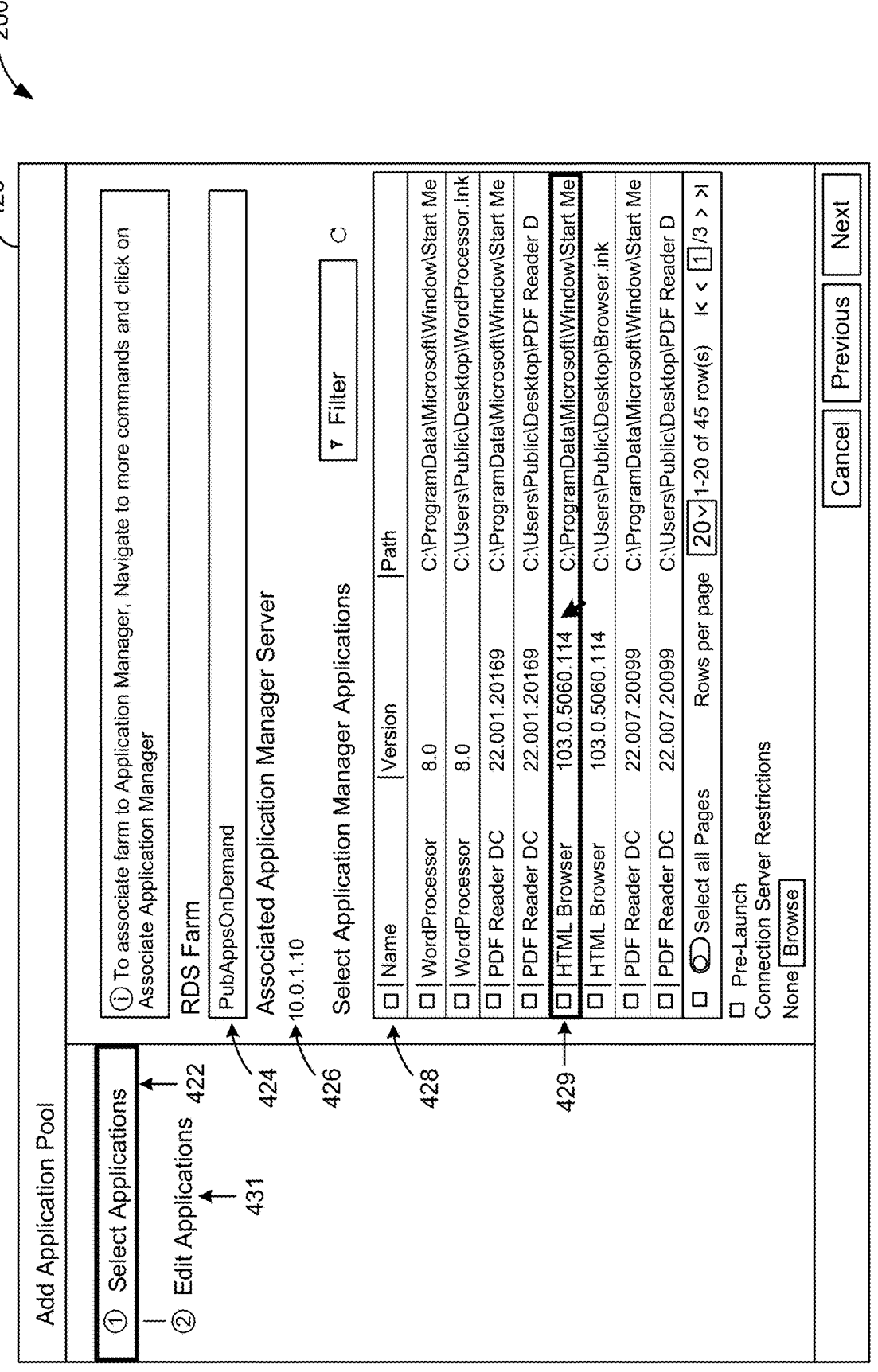
Figure 4C:
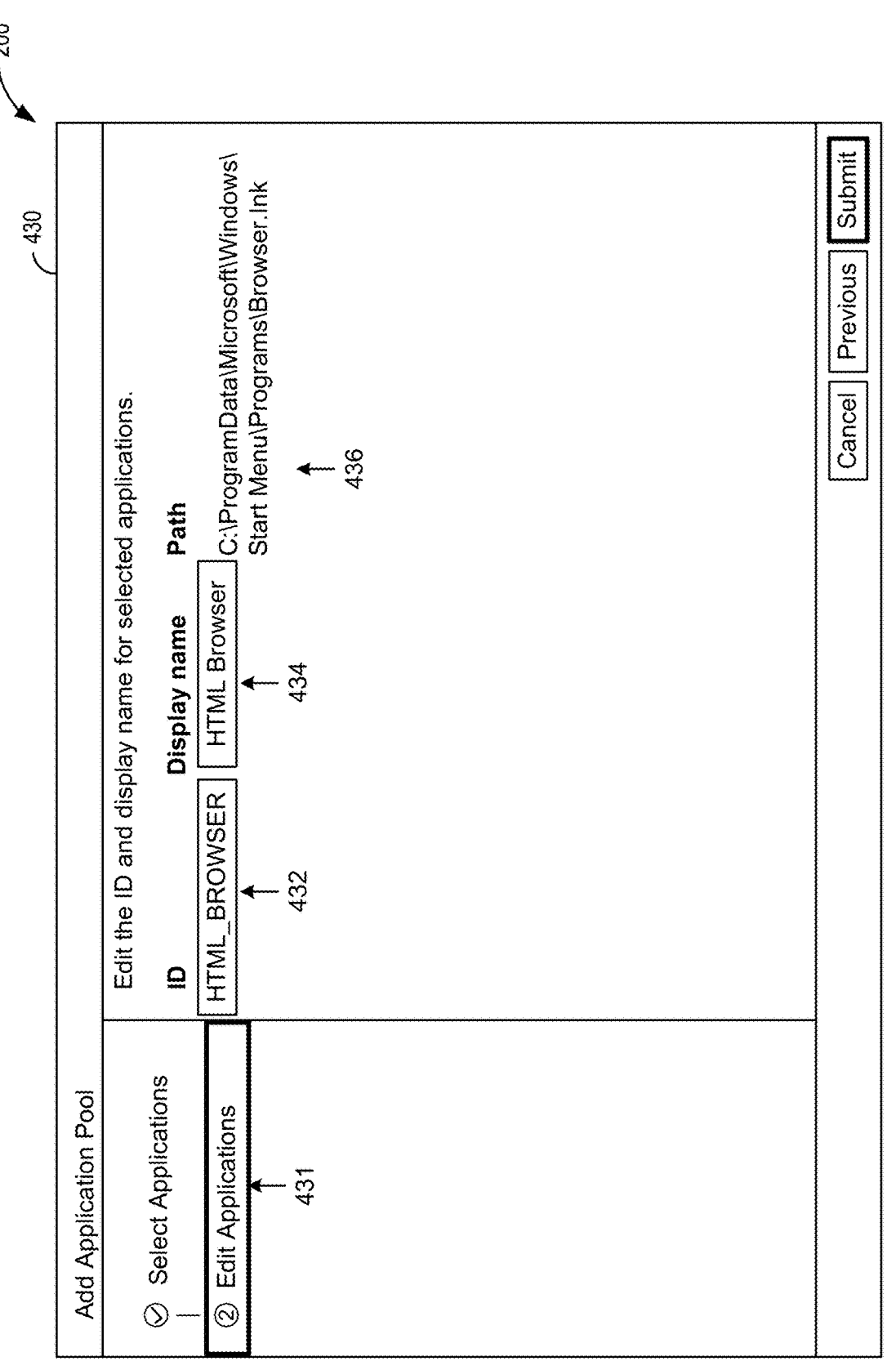
Figure 4D:
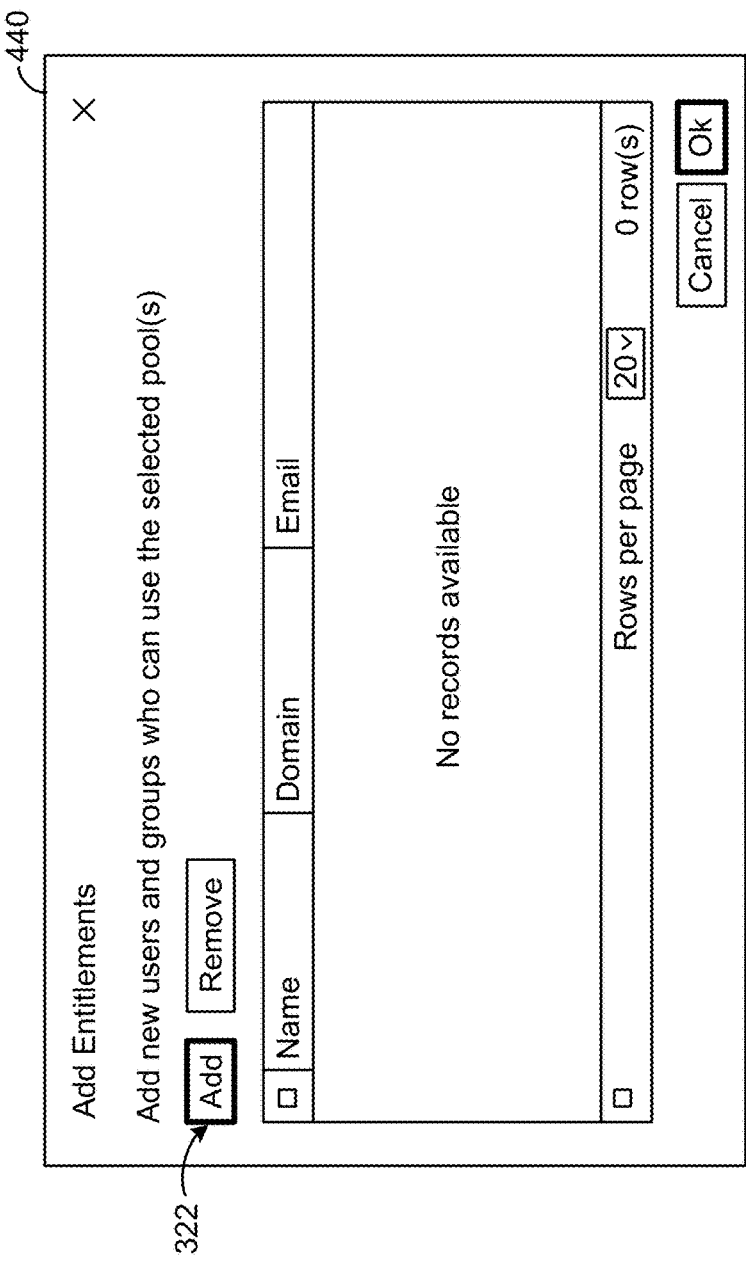
Figure 4E:
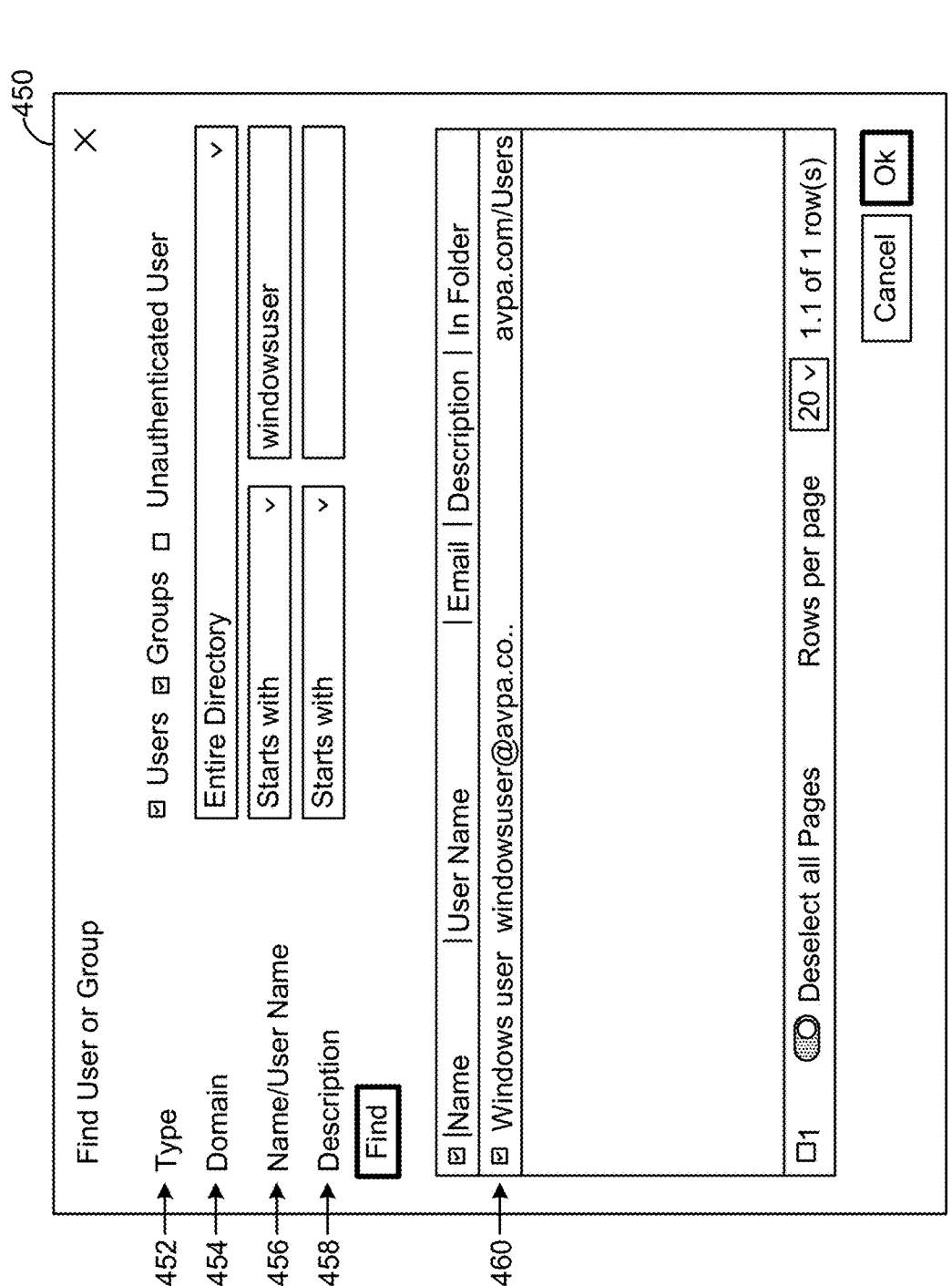
Figure 4F:
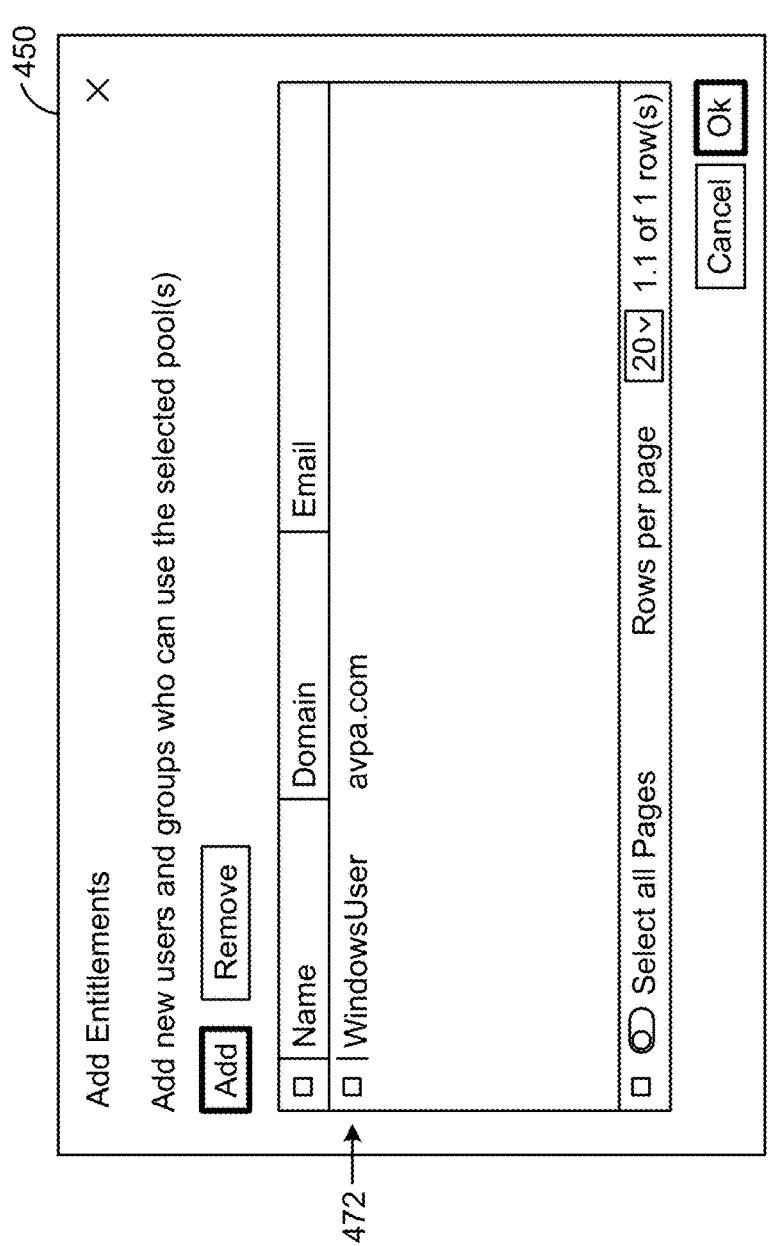

The UI advances to a screen 430 for an "Edit Applications" step 431 as shown in FIG. 4C. On this screen 430, the admin 106 may edit an "ID" input field 432 and a "Display Name" input field 434 to be used for this example OD application 144. A path 436 for the OD application 144 is also displayed here. Next, the UI displays an "Add Entitlements" screen 440 as shown in FIG. 4D. Here, no entitlements are currently configured. The admin 106 selects an "Add" button 322 to add OD application 126 user entitlements. The UI displays a "Find User or Group" screen 450 as shown in FIG. 4E. This screen 450 allows the admin 106 to search for and select one or more users or user groups for which to configure OD application 126 user entitlements. The screen 450 includes several "Type" selection boxes 452 (e.g., "Users", "Groups", "Unauthenticated Users"), a "Domain" drop-down menu 454, "Name/User Name" drop-down menu and input field 456, and a "Description" drop-down menu and input field 458. The admin 106 may enter such input data to filter and find particular users of the connection server 120. Upon initiating a search, the screen 450 displays zero or more rows of users or groups in a selection pane 460. In this example search, the admin 106 entered the user name "windowsuser" in the "Name/User Name" field 456 and the search found one matching user "WindowsUser". The admin 106 selects this particular "WindowsUser" and advances to the next screen. The UI finally returns to the "Add Entitlements" screen 440 as shown in FIG. 4F, and now an entry 472 for user "WindowsUser" is listed under this example entitlement. Upon completion of this screen 450, the connection server 120 adds an OD application 126 user entitlement for the user "WindowsUser", allowing that user to execute the OD application 144 called "Google Chrome" from the application manager 140.

Figure 5:
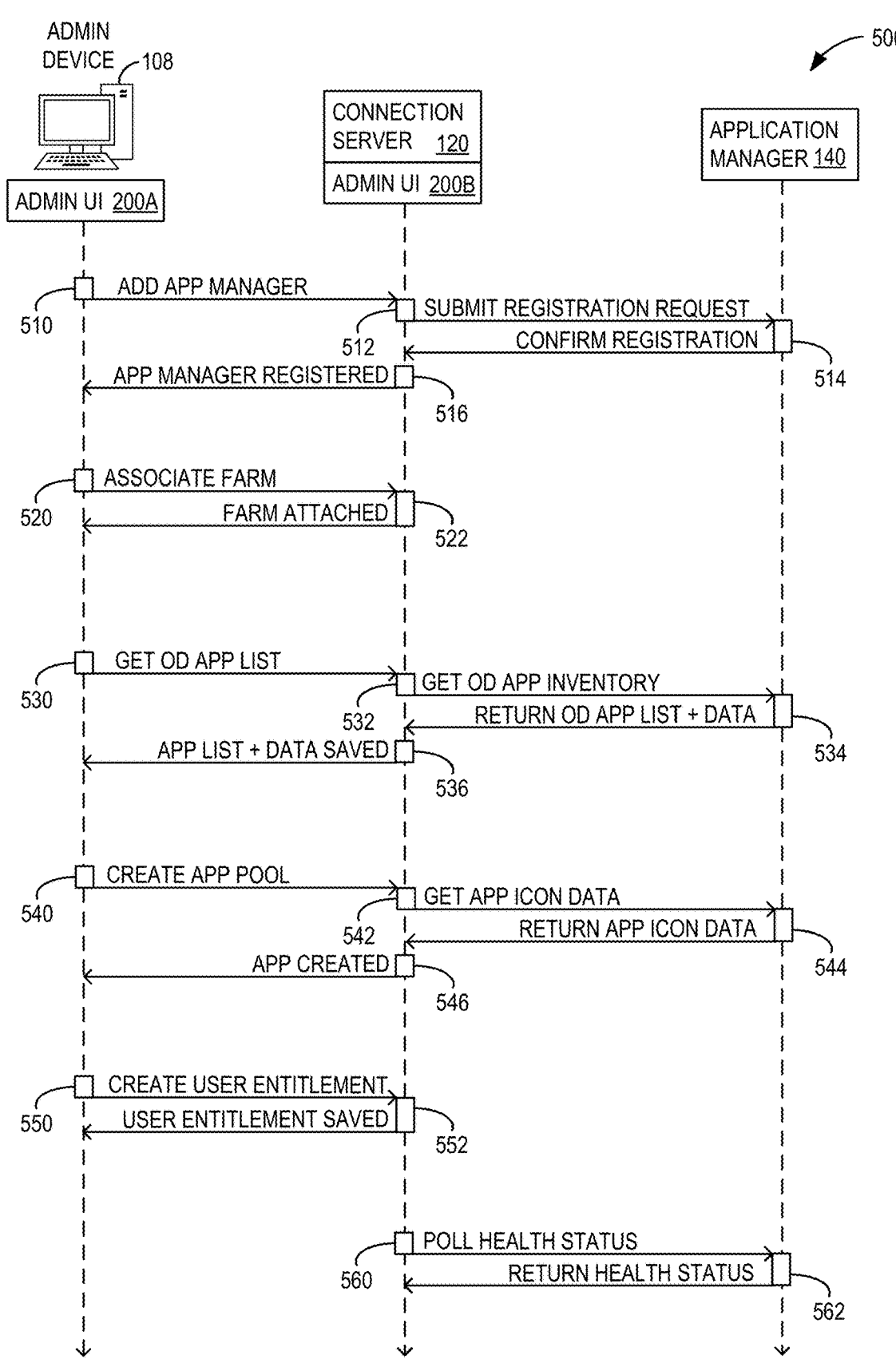
FIG. 5 is a sequence diagram that illustrates example processes for establishing trust between the connection server and the application manager and for configuring OD application user entitlements on the connection server within an example architecture, such as the architecture of FIG. 1.

FIG. 5 is a sequence diagram that illustrates example processes 500 for establishing trust between the connection server 120 and the application manager 140 and for configuring OA application user entitlements 126 on the connection server 120 within the architecture 100 of FIG. 1. In some examples, some or all of the processes 500 are similar to the flows described in FIG. 2A to FIG. 4F, and the UI is depicted here with client-side admin UI 200A executing and displaying the UI on the admin device 108 and being supported by a server-side admin UI 200B component on the connection server 120.

In this example, at 510, the admin UI 200A initiates a registration process such as shown in FIG. 2A to FIG. 2C to register the connection server 120 with the application manager 140 and add this particular application manager 140 to the connection server 120. At 512, the connection server 120 submits the registration request 160 and public certificate 162 to the application manager 140, along with credentials for the application manager 140 (e.g., to establish permission for this trust and registration). At 514, after authenticating the credentials, the application manager 140 stores the public certificate 162 for the connection server 120 and confirms the application request with the connection server 120 (e.g., via a registration confirmation message or the like). At 516, the UI displays the application manager 140 as registered and available for use.

At 520, the admin UI 200A initiates a farm association process such as shown in FIG. 3A and FIG. 3B to associate a group (e.g., farm 314) of devices (e.g., RDS hosts 130) with the registered application manager 140. The selected farm 314 is configured to be able to use OD applications 144 from the application manager 140 at 522.

At 530, the admin UI 200A initiates a retrieval of an OD application inventory from the application manager 140 and the connection server 120 sends an OD application list request to the application manager 140 at 532. At 534, the application manager 140 returns the OD applications list 164 to the connection server 120, along with associated application data for each OD app 144 (e.g., version number, application name, application ID, and the like), and may authenticate the request prior to responding (e.g., via a digital signature in the request and verification with the public certificate 162). At 536, the connection server 120 saves and stores the OD applications list 164 for later use with OD applications 126 user entitlements and may display the OD applications list 164 in the admin UI 200A (e.g., as shown in the list 428 of FIG. 4B).

At 540, the admin UI 200A creates an application pool for the OD applications 144. At 542, the connection server 120 requests application icon data for the OD applications 144 from the application manager 140. At 544, the application manager 140 returns the application icon data to the connection server 120 and the admin UI confirms the creation of the application pool at 546.

At 550, the admin UI 200A creates an OD application 126 user entitlement for one or more users, such as shown in FIG. 4D to FIG. 4F. The admin 106, for example, searches for and selects one or more users to associate with this application or application pool (e.g., as shown in FIG. 4E) and saves the user list. At 552, the connection server 120 creates user entitlements 122 for OD application 126 by assigning the application pool to the list of selected users, or vice versa, thus allowing those particular users to see the icons for those OD applications 144 via the client 110 and launch those OD applications 144 from the client 110.

Periodically, the connection server 120 may poll the health status of the application manager 140. At 560, the connection server 120 sends a health status message to the application manager 140 (e.g., to ensure connectivity, application availability, and such). At 562, the application manager 140 sends a health status response to the connection server 120.

Figure 6:
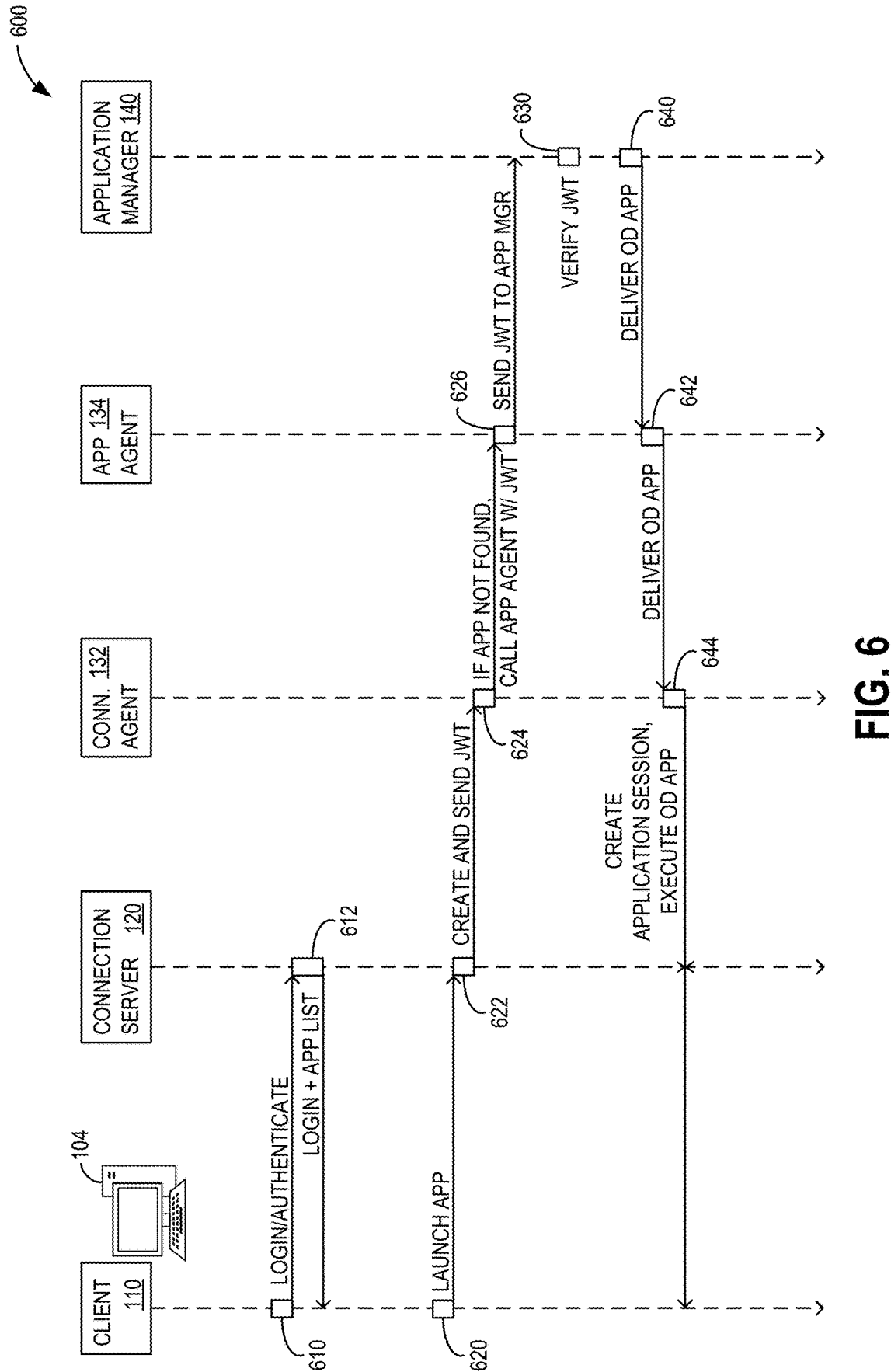
FIG. 6 is a sequence diagram that illustrates an example process for executing OD applications by the client in an example architecture, such as the architecture of FIG. 1.

FIG. 6 is a sequence diagram that illustrates example process 600 for executing OD applications 144 by the client 110 in the architecture 100 of FIG. 1. In the example, the client 110 transmits a login request and user credentials to authenticate the user 102 at 610 (e.g., similar to authenticate user 112 of FIG. 1). The connection server 120 authenticates the user 102 and identifies a list of OD applications 144 for which the user 102 is entitled (e.g., based on a lookup of a username of the user 102 against the user entitlements 122 of OD applications 126). At 612, the connection server 120 confirms login of the user 102 with the client 110 and transmits the application list to the client 110 (e.g., including application icons, application display names, application IDs, and such application metadata). The client 110 displays these applications to the user 102 for selection and execution.

At 620, the user 102 launches one of the OD applications 144 via the client 110. The client 110 transmits an application launch 114 message to the connection server 120 to start a launch of an OD application 144. This application launch 114 message includes the application ID or application group ID (e.g., to identify which particular app(s) are requested for execution), and may include other user or application data such as the user ID of the user 102. At 622, the connection server 120 authenticates the application launch 114 request and verifies that the user 102 is entitled to execute this requested OD application 144 (e.g., via user entitlements 122 for OD application 126). If user entitlement is verified for this application launch 114, the connection server 120 creates and transmits an application launch 170 request to the RDSH 130. In the example, the application launch 170 includes a JWT 172 that is created for this application launch 114. As discussed above, the JWT 172 includes application data for the requested OD application 144, as well as a digital signature created by the connection server 120. At 624, the connection agent 132 of the RDSH 130 receives the application launch 170 message and determines whether or not the requested OD application 144 is already available to the connection agent 132. If the OD application 144 is not already available, the connection agent 132 sends the JWT 172 to the application agent 134 for processing. At 626, the application agent 134 identifies the application manager 140 that provides this requested OD application 144 and transmits an application request 174 and the JWT 172 to the application manager 140.

At 630, the application manager 140 receives the application request 174 and verifies the JWT 172 (e.g., identifying which connection server 120 originated this request based on the contents of the JWT 172, identifying the public certificate 162 associated with that connection server 120, and verifying the digital signature provided in the JWT 172 using the public key of the connection server 120 from the public certificate 162). If the JWT 172 is successfully verified, this application request 174 is considered valid by the application manager 140 (e.g., without performance of user entitlement by the application manager 140). As such, at 640, the application manager 140 identifies the requested OD application 144 and delivers that OD application 144 to the application agent 134. In some examples, the OD application 144 is delivered for use by mounting an application virtual disk (e.g., vmdk 911-918) to the RDSH 130. In other examples, the OD application 144 is delivered by performing an installation of the OD app 144 on the RDSH 130. The application agent 134 delivers the OD application 144 to the connection agent 132 at 642. At 644, the connection agent 132 creates the application session 152 for the client 110 and executes this OD application 144 within the application session 152. The launch of the OD app 144 is independent of client type or client OS of the client 110, as the OD app 144 is executed by the RDSH 130 and provided to the client 110 via the application session 152.

FIG. 7 illustrates a flowchart 700 of exemplary operations associated with performing user entitlements for applications in the architecture 100 of FIG. 1. In this example, the connection server 120 transmits a registration request to an application manager server at operation 710, the registration request including administration credentials for the application manager server and a public certificate of the connection server. The administration credentials cause the application manager server (e.g., application manager 140) to trust the connection server regarding application requests. At operation 712, the connection server 120 receives a list of applications provided by the application manager server. At operation 714, the connection server 120 receives input identifying the first application and a user identification (ID) of a first user (e.g., from the admin device 108). At operation 716, the connection server 120 creates a user entitlement that permissions the first application to be executed by the first user.

At operation 718, the connection server 120 receives a connection request from the user device, the connection request including user credentials for a first user. At operation 720, the connection server 120 authenticates the connection request using the user credentials. At operation 722, the connection server 120 identifies one or more applications for which the first user is permissioned, by the connection server, to execute based on user entitlements. At operation 724, the connection server transmits a list of the one or more applications to the user device, causing the user device to display the list of the one or more applications by the user device.

At operation 726, the connection server 120 receives a user application launch request from the user device, the user application launch request identifying a first application provided by the application manager server. At operation 728, and in response to receiving the user application launch request from the user device, the connection server 120 verifies that the first user is permissioned to execute the first application based on the user entitlement prior to transmitting the proxy application launch request and generates a proxy application launch request for the received user application launch request, the proxy application launch request identifying the first application and including a signed message created with a private key associated with the public certificate. In some examples, the proxy application launch request includes a JavaScript Object Notation (JSON) Web Token (JWT) that includes the signed message and an application ID associated with the first application. At operation 730, the connection server 120 transmits the proxy application launch request for delivery to the application manager server, causing the application manager server to make the first application available to the user device after authenticating the signed message. In some examples, transmitting the proxy application launch request includes transmitting the proxy application launch request to a remote desktop server host (RDSH) that is configured to provide virtual desktop sessions to user devices, the RDSH being configured to transmit the proxy application launch request to the application manager server.

At operation 732, an RDSH receives the proxy application launch request from the connection server 120 and transmits the proxy application launch request to the application manager server. At operation 734, the RDSH receives the first application from the application manager server. At operation 736, the RDSH creates an application session for the user device. At operation 738, the RDSH executes the first application within the application session.

In some examples, the connection server 120 locally manages user entitlements for a first group of applications that are provided by the connection server without use of the application manager server, the application manager server locally manages user entitlements for a second group of applications, and the application manager server does not perform user entitlement verification for the proxy application launch request.

Figure 8:
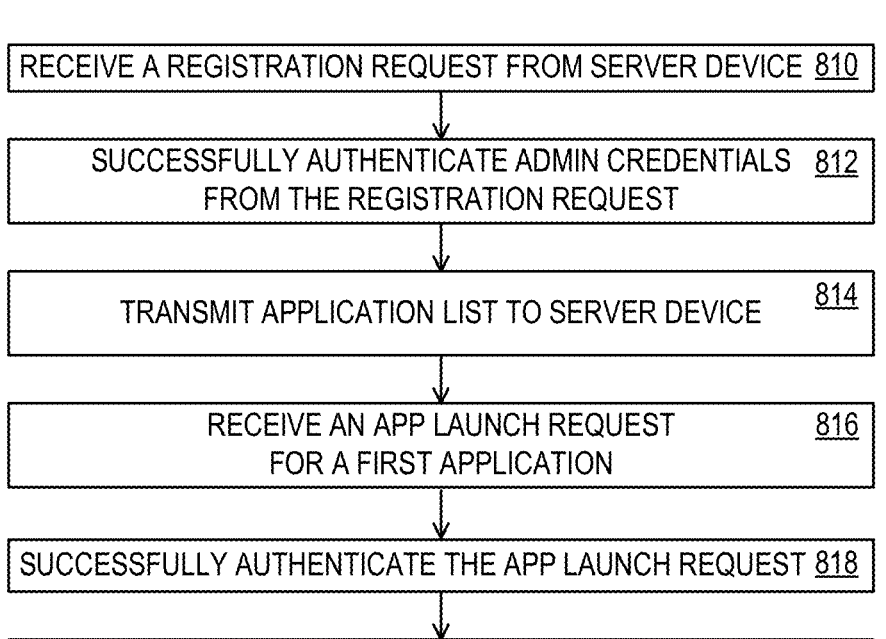
FIG. 8 illustrates a flowchart of exemplary operations associated with establishing trust between an application manager and another system for delivery of applications in an example architecture, such as the architecture of FIG. 1.

FIG. 8 illustrates a flowchart 800 of exemplary operations associated with establishing trust between an application manager and another system for delivery of applications in the architecture 100 of FIG. 1. In some examples, the application manager is the application manager 140 and the other system is the connection server 120. In this example, the application manager 140 receives a registration request from a first server device (e.g., connection server 120) at 810, the registration request including administration credentials for an application manager service and a public certificate of the first server device. At operation 812, the application manager 140 successfully authenticates the administration credentials, thereby causing trust in the first server device regarding application requests. At operation 814, the application manager 140 transmits a list of application to the first server device after successfully authenticating the administration credentials.

At operation 816, the application manager 140 receives an application launch request, the application launch request identifying a first application and including a digital signature of the first server device. In some examples, the application launch request includes a JavaScript Object Notation (JSON) Web Token (JWT) that includes the digital signature and an application ID associated with the first application. At operation 818, the application manager 140 successfully authenticates the digital signature of the first server device using the public certificate. At operation 820, and upon successful authentication of the digital signature, the application manager 140 transmits the first application for execution.

In some examples, the application manager 140 does not perform user entitlement verification for the application launch request. In some examples, the first server device locally manages user entitlements for a first group of applications that are provided by the first server device, the application manager 140 manages user entitlements for a second group of applications, and the application manager 140 does not perform user entitlement verification for the application launch request. In some examples, the application manager 140 performs user entitlement verification when other application launch requests are received from other devices that are not registered for trusted user entitlement.

Examples of architecture 100 are operable with virtualized and non-virtualized storage solutions. FIG. 9 illustrates a virtualization architecture 900 that may be used as a version of computing platform. Virtualization architecture 900 is comprised of a set of compute nodes 921-923, interconnected with each other and a set of storage nodes 941-943 according to an embodiment. In other examples, a different number of compute nodes and storage nodes may be used. Each compute node hosts multiple objects, which may be virtual machines (VMs, such as base objects, linked clones, and independent clones), containers, applications, or any compute entity (e.g., computing instance or virtualized computing instance) that consumes storage. When objects are created, they may be designated as global or local, and the designation is stored in an attribute. For example, compute node 921 hosts objects 901, 902, and 903; compute node 922 hosts objects 904, 905, and 906; and compute node 923 hosts objects 907 and 908. Some of objects 901-908 may be local objects. In some examples, a single compute node may host 50, 100, or a different number of objects. Each object uses a VM disk (VMDK), for example VMDKs 911-918 for each of objects 901-908, respectively. Other implementations using different formats are also possible. A virtualization platform 930, which includes hypervisor functionality at one or more of compute nodes 921, 922, and 923, manages objects 901-908. In some examples, various components of virtualization architecture 900, for example compute nodes 921, 922, and 923, and storage nodes 941, 942, and 943 are implemented using one or more computing apparatus such as computing apparatus 1018 of FIG. 10.

Virtualization software that provides software-defined storage (SDS), by pooling storage nodes across a cluster, creates a distributed, shared data store, for example a storage area network (SAN). Thus, objects 901-908 may be virtual SAN (vSAN) objects. In some distributed arrangements, servers are distinguished as compute nodes (e.g., compute nodes 921, 922, and 923) and storage nodes (e.g., storage nodes 941, 942, and 943). Although a storage node may attach a large number of storage devices (e.g., flash, solid state drives (SSDs), non-volatile memory express (NVMe), Persistent Memory (PMEM), quad-level cell (QLC)) processing power may be limited beyond the ability to handle input/output (I/O) traffic. Storage nodes 941-943 each include multiple physical storage components, which may include flash, SSD, NVMe, PMEM, and QLC storage solutions. For example, storage node 941 has storage 951, 952, 952, and 954; storage node 942 has storage 955 and 956; and storage node 943 has storage 957 and 958. In some examples, a single storage node may include a different number of physical storage components.

In the described examples, storage nodes 941-943 are treated as a SAN with a single global object, enabling any of objects 901-908 to write to and read from any of storage 951-958 using a virtual SAN component 932. Virtual SAN component 932 executes in compute nodes 921-923. Using the disclosure, compute nodes 921-923 are able to operate with a wide range of storage options. In some examples, compute nodes 921-923 each include a manifestation of virtualization platform 930 and virtual SAN component 932. Virtualization platform 930 manages the generating, operations, and clean-up of objects 901 and 902. Virtual SAN component 932 permits objects 901 and 902 to write incoming data from object 901 and incoming data from object 902 to storage nodes 941, 942, and/or 943, in part, by virtualizing the physical storage components of the storage nodes.

Additional Examples

An example method of delivering applications on demand comprises: transmitting, by a connection server, a registration request to an application manager server, the registration request including administration credentials for the application manager server and a public certificate of the connection server, the administration credentials causing the application manager server to trust the connection server regarding application requests; receiving, by the connection server, a user application launch request from a user device, the user application launch request identifying a first application provided by the application manager server; generating, by the connection server, a proxy application launch request for the received user application launch request, the proxy application launch request identifying the first application and including a signed message created with a private key associated with the public certificate; and transmitting the proxy application launch request for delivery to the application manager server, causing the application manager server to make the first application available to the user device after authenticating the signed message.

An example computer system comprises: a memory device storing user entitlement data; at least one processor of a first server device; and a non-transitory computer readable medium having stored thereon program code executable by the at least one processor, the program code causing the at least one processor to: transmit a registration request to an application manager device, the registration request including administration credentials for the application manager device and a public certificate of the first server device, the administration credentials causing the application manager device to trust the first server device regarding application requests; receive a user application launch request from a user device, the user application launch request identifying a first application provided by the application manager device; create a proxy application launch request for the received user application launch request, the proxy application launch request identifying the first application and including a signed message created with a private key associated with the public certificate; and transmit the proxy application launch request for delivery to the application manager device, causing the application manager device to make the first application available to the user device after authenticating the signed message.

An example non-transitory computer storage medium has stored thereon program code executable by a processor, the program code embodying a program code method comprising: transmitting, by a connection server, a registration request to an application manager server, the registration request including administration credentials for the application manager server and a public certificate of the connection server, the administration credentials causing the application manager server to trust the connection server regarding application requests; receiving, by the connection server, a user application launch request from a user device, the user application launch request identifying a first application provided by the application manager server; generating, by the connection server, a proxy application launch request for the received user application launch request, the proxy application launch request identifying the first application and including a signed message created with a private key associated with the public certificate; and transmitting the proxy application launch request for delivery to the application manager server, causing the application manager server to make the first application available to the user device after authenticating the signed message.

An example method of delivering applications comprises: receiving a registration request from a first server device, the registration request including administration credentials for an application manager service and a public certificate of the first server device; successfully authenticating the administration credentials, thereby causing trust in the first server device regarding application requests; receiving an application launch request, the application launch request identifying a first application and including a digital signature of the first server device; successfully authenticating the digital signature of the first server device using the public certificate; and upon successful authentication of the digital signature, transmitting the first application for execution.

An example computer system comprises: at least one processor of a first server device; and a non-transitory computer readable medium having stored thereon program code executable by the at least one processor, the program code causing the at least one processor to: receive a registration request from a first server device, the registration request including administration credentials for an application manager service and a public certificate of the first server device; successfully authenticate the administration credentials, thereby causing trust in the first server device regarding application requests; receive an application launch request, the application launch request identifying a first application and including a digital signature of the first server device; successfully authenticate the digital signature of the first server device using the public certificate; and upon successful authentication of the digital signature, transmit the first application for execution.

An example non-transitory computer storage medium has stored thereon program code executable by a processor, the program code embodying a program code method comprising: receiving a registration request from a first server device, the registration request including administration credentials for an application manager service and a public certificate of the first server device; successfully authenticating the administration credentials, thereby causing trust in the first server device regarding application requests; receiving an application launch request, the application launch request identifying a first application and including a digital signature of the first server device; successfully authenticating the digital signature of the first server device using the public certificate; and upon successful authentication of the digital signature, transmitting the first application for execution.

Another example computer system comprises: a processor; and a non-transitory computer readable medium having stored thereon program code executable by the processor, the program code causing the processor to perform a method disclosed herein. Another example non-transitory computer storage medium has stored thereon program code executable by a processor, the program code embodying a method disclosed herein.

Alternatively, or in addition to the other examples described herein, examples include any combination of the following:

transmitting a registration request to an application manager server;

a registration request that includes administration credentials for an application manager server;

a registration request that includes a public certificate;

use of administration credentials to cause a server to trust another server regarding application requests;

receiving a user application launch request from a user device;

a user application launch request that identifies an application provided by an application server;

generating a proxy application launch request for a user application launch request;

a proxy application launch request that identifies an application;

a proxy application launch request that includes a signed message created with a private key associated with the public certificate;

transmitting a proxy application launch request for delivery to an application server;

a proxy application launch request causing an application server to make an application available to a user device after authenticating a signed message;

a proxy application launch request that is or otherwise includes a JavaScript Object Notation (JSON) Web Token (JWT);

a JWT that includes a signed message;

a JWT that includes an application ID associated with a first application;

transmitting a proxy application launch request to a remote desktop server host (RDSH);

an RDSH server that is configured to provide virtual application sessions to user devices;

an RDSH that is configured to transmit the proxy application launch request to the application manager server;

receiving a first application from an application server;

generating a application session for the user device;

executing an application within the application session;

receiving first input identifying an application and a user identification (ID) of a user;

creating a user entitlement that permissions an application to be executed by a user;

verifying that a user is permissioned to execute an application based on a user entitlement;

receiving a connection request from a user device;

a connection request includes user credentials for a user;

authenticating a connection request using user credentials;

identifying one or more applications for which a user is permissioned to execute based on user entitlements;

transmitting a list of the one or more applications to a device;

causing a user device to display the list of the one or more applications by the user device;

a first server locally managing user entitlements for a first group of applications that are provided by the connection server without use of the application manager server;

a second server locally managing user entitlements for a second group of applications that does not perform user entitlement verification for proxy application launch requests;

receiving a registration request from a first server device;

a registration request that includes administration credentials for an application manager service;

a registration request that includes a public certificate of the first server device;

successfully authenticating administration credentials, thereby causing trust in the first server device regarding application requests;

receiving an application launch request;

an application launch request that identifies a first application;

an application launch request that includes a digital signature of a server;

successfully authenticating the digital signature of the first server device using the public certificate;

transmitting the first application for execution;

transmitting a list of application to the first server device after successfully authenticating the administration credentials;

displaying application icons on a user display device;

executing a connection agent and an application agent on an RDSH; and a server that manages user entitlements for both locally managed applications and remotely managed applications.

Exemplary Operating Environment

Figure 10:
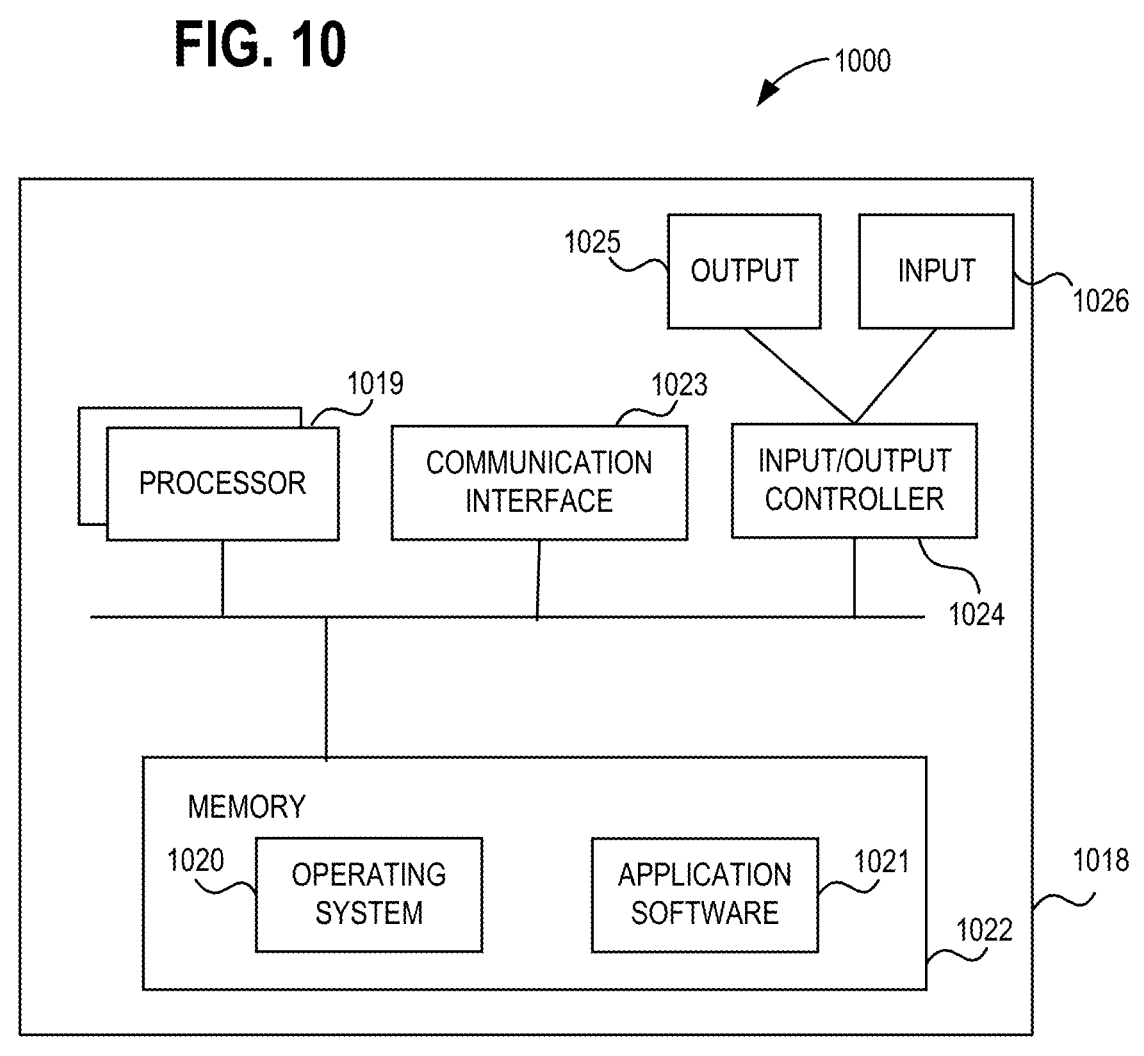

The present disclosure is operable with a computing device (computing apparatus) according to an embodiment shown as a functional block diagram 1000 in FIG. 10. FIG. 10 illustrates a block diagram of an example computing apparatus that may be used as a component of the architectures of FIG. 1 and FIG. 9. In an embodiment, components of a computing apparatus 1018 are implemented as part of an electronic device according to one or more embodiments described in this specification. The computing apparatus 1018 comprises one or more processors 1019 which may be microprocessors, controllers, or any other suitable type of processors for processing computer executable instructions to control the operation of the electronic device. Alternatively, or in addition, the processor 1019 is any technology capable of executing logic or instructions, such as a hard-coded machine. Platform software comprising an operating system 1020 or any other suitable platform software may be provided on the computing apparatus 1018 to enable application software 1021 to be executed on the device. According to an embodiment, the operations described herein may be accomplished by software, hardware, and/or firmware.

Computer executable instructions may be provided using any computer-readable medium (e.g., any non-transitory computer storage medium) or media that are accessible by the computing apparatus 1018. Computer-readable media may include, for example, computer storage media such as a memory 1022 and communications media. Computer storage media, such as a memory 1022, include volatile and non-volatile, removable, and non-removable media implemented in any method or technology for storage of information such as computer readable instructions, data structures, program modules or the like. Computer storage media include, but are not limited to, hard disks, RAM, ROM, EPROM, EEPROM, NVMe devices, persistent memory, phase change memory, flash memory or other memory technology, compact disc (CD, CD-ROM), digital versatile disks (DVD) or other optical storage, magnetic cassettes, magnetic tape, magnetic disk storage, shingled disk storage or other magnetic storage devices, or any other non-transmission medium (e., non-transitory) that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 1022) is shown within the computing apparatus 1018, it will be appreciated by a person skilled in the art, that the storage may be distributed or located remotely and accessed via a network or other communication link (e.g., using a communication interface 1023). Computer storage media are tangible, non-transitory, and are mutually exclusive to communication media.

The computing apparatus 1018 may comprise an input/output controller 1024 configured to output information to one or more output devices 1025, for example a display or a speaker, which may be separate from or integral to the electronic device. The input/output controller 1024 may also be configured to receive and process an input from one or more input devices 1026, for example, a keyboard, a microphone, or a touchpad. In one embodiment, the output device 1025 also acts as the input device. An example of such a device may be a touch sensitive display. The input/output controller 1024 may also output data to devices other than the output device, e.g., a locally connected printing device. In some embodiments, a user may provide input to the input device(s) 1026 and/or receive output from the output device(s) 1025.

The functionality described herein can be performed, at least in part, by one or more hardware logic components. According to an embodiment, the computing apparatus 1018 is configured by the program code when executed by the processor 1019 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special purpose computing device when programmed to execute the instructions described herein. The detailed description provided above in connection with the appended drawings is intended as a description of a number of embodiments and is not intended to represent the only forms in which the embodiments may be constructed, implemented, or utilized. Although these embodiments may be described and illustrated herein as being implemented in devices such as a server, computing devices, or the like, this is only an exemplary implementation and not a limitation. As those skilled in the art will appreciate, the present embodiments are suitable for application in a variety of different types of computing devices, for example, PCs, servers, laptop computers, tablet computers, etc.

The term "computing device" and the like are used herein to refer to any device with processing capability such that it can execute instructions. Those skilled in the art will realize that such processing capabilities are incorporated into many different devices and therefore the terms "computer", "server", and "computing device" each may include PCs, servers, laptop computers, mobile telephones (including smart phones), tablet computers, and many other devices. Any range or device value given herein may be extended or altered without losing the effect sought, as will be apparent to the skilled person. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While no personally identifiable information is tracked by aspects of the disclosure, examples may have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," and "the" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computerized method of delivering applications on demand, the method comprising:

transmitting, by a connection server, a registration request to an application manager server, the registration request including administration credentials for the application manager server and a public certificate of the connection server, successful verification of the administration credentials causing the application manager server to trust the connection server regarding application requests;

receiving, by the connection server, a user application launch request from a user device, the user application launch request identifying an application provided by the application manager server;

generating, by the connection server, a proxy application launch request for the received user application launch request, the proxy application launch request identifying the application and including a signed message created with a private key associated with the public certificate; and transmitting the proxy application launch request for delivery to the application manager server, causing the application manager server to make the application available to the user device after authenticating the signed message with the public certificate of the registration request.

2. The computerized method of claim 1, wherein the proxy application launch request includes a JavaScript Object Notation (JSON) Web Token (JWT) that includes the signed message, an application ID associated with the application, and a user identifier (ID) of a user that generated the user application launch request.

3. The computerized method of claim 1, wherein transmitting the proxy application launch request includes transmitting the proxy application launch request to a remote desktop server host (RDSH) that is configured to provide a virtual application session to the user device, the RDSH being configured to transmit the proxy application launch request to the application manager server.

4. The computerized method of claim 3, further comprising:

receiving, by the RDSH, the application from the application manager server;

generating, by the RDSH, the virtual application session for the user device; and executing, by the RDSH, the application within the virtual application session.

5. The computerized method of claim 1, further comprising:

receiving an input identifying the application and a user identification (ID) of a first user;

creating by the connection server, a user entitlement that permissions the application to be executed by the first user; and in response to receiving the user application launch request from the user device, verifying that the first user is permissioned to execute the application based on the user entitlement prior to transmitting the proxy application launch request.

6. The computerized method of claim 1, further comprising:

receiving, at the connection server, a connection request from the user device, the connection request including user credentials for a first user;

authenticating the connection request using the user credentials;

identifying one or more applications for which the first user is permissioned, by the connection server, to execute based on user entitlements; and transmitting a list of the one or more applications to the user device, causing the user device to display the list of the one or more applications by the user device.

7. The computerized method of claim 1, wherein the connection server locally manages user entitlements for a first group of applications that are provided by the connection server without use of the application manager server, wherein the application manager server locally manages user entitlements for a second group of applications, wherein the second group of applications includes the application, wherein the application manager server does not perform user entitlement verification for the proxy application launch request.

8. A computer system comprising:

a memory device storing user entitlement data;

at least one processor of a first server device; and a non-transitory computer readable medium having stored thereon program code executable by the at least one processor, the program code causing the at least one processor to:

transmit a registration request to an application manager device, the registration request including administration credentials for the application manager device and a public certificate of the first server device, successful verification of the administration credentials causing the application manager device to trust the first server device regarding application requests;

receive a user application launch request from a user device, the user application launch request identifying an application provided by the application manager device;

create a proxy application launch request for the received user application launch request, the proxy application launch request identifying the application and including a signed message created with a private key associated with the public certificate; and transmit the proxy application launch request for delivery to the application manager device, causing the application manager device to make the application available to the user device after authenticating the signed message with the public certificate of the registration request.

9. The computer system of claim 8, wherein the proxy application launch request includes a JavaScript Object Notation (JSON) Web Token (JWT) that includes the signed message, an application ID associated with the application, and a user identifier (ID) of a user that generated the user application launch request.

10. The computer system of claim 8, further comprising a remote desktop server host (RDSH), wherein transmitting the proxy application launch request includes transmitting the proxy application launch request to the RDSH, wherein the RDSH is configured to:

provide a virtual session to the user device; and transmit the proxy application launch request to the application manager device.

11. The computer system of claim 10, wherein the RDSH is further configured to:

receive the application from the application manager device;

create the virtual session for the user device; and execute the application within the virtual session.

12. The computer system of claim 8, the program code further causing the at least one processor to:

receive an input identifying the application and a user identification (ID) of a first user;

create a user entitlement that permissions the application to be executed by the first user; and in response to receiving the user application launch request from the user device, verify that the first user is permissioned to execute the application based on the user entitlement prior to transmitting the proxy application launch request.

13. The computer system of claim 8, the program code further causing the at least one processor to:

receive a connection request from the user device, the connection request including user credentials for a first user;

authenticate the connection request using the user credentials;

identify one or more applications for which the first user is permissioned, by the first server device, to execute based on user entitlements; and transmit a list of the one or more applications to the user device, causing the user device to display the list of the one or more applications.

14. The computer system of claim 8, wherein the first server device locally manages user entitlements for a first group of applications that are provided by the first server device without use of the application manager device, wherein the application manager device locally manages user entitlements for a second group of applications, wherein the second group of applications includes the application, wherein the application manager device does not perform user entitlement verification for the proxy application launch request.

15. A non-transitory computer storage medium having stored thereon program code executable by a processor, the program code embodying a method comprising:

receiving a registration request from a first server device, the registration request including administration credentials for an application manager service and a public certificate of the first server device;

successfully authenticating the administration credentials, thereby causing trust in the first server device regarding application requests;

receiving an application launch request, the application launch request identifying an application and including a digital signature of the first server device;

successfully authenticating the digital signature of the first server device using the public certificate; and upon successful authentication of the digital signature, transmitting the application for execution.

16. The non-transitory computer storage medium of claim 15, wherein the application launch request includes a JavaScript Object Notation (JSON) Web Token (JWT) that includes the digital signature and an application ID associated with the application.

17. The non-transitory computer storage medium of claim 15, wherein the first server device locally manages user entitlements for a first group of applications that are provided by the first server device, wherein the processor locally manages user entitlements for a second group of applications, wherein the second group of applications includes the application, wherein the processor does not perform user entitlement verification for the application launch request.

18. The non-transitory computer storage medium of claim 15, wherein the processor does not perform user entitlement verification for the application launch request.

19. The non-transitory computer storage medium of claim 15, wherein the program code method further comprises performing user entitlement verification when other application launch requests are received from other devices that are not registered for trusted user entitlement.

20. The non-transitory computer storage medium of claim 15, wherein the program code method further comprises transmitting a list of applications to the first server device after successfully authenticating the administration credentials.

* * * * *